(12) United States Patent
Winn et al.

(10) Patent No.: US 11,483,463 B2
(45) Date of Patent: Oct. 25, 2022

(54) ADAPTIVE GLARE REMOVAL AND/OR COLOR CORRECTION

(71) Applicant: Google LLC, Mountain View, CA (US)

(72) Inventors: Julia Winn, Mountain View, CA (US); Abraham Stephens, San Mateo, CA (US); Daniel Pettigrew, Pacific Palisades, CA (US); Aaron Maschinot, Somerville, MA (US); Ce Liu, Cambridge, MA (US); Michael Krainin, Arlington, MA (US); Michael Rubinstein, Natick, MA (US); Jingyu Cui, Milpitas, CA (US)

(73) Assignee: Google LLC, Mountain View, CA (US)

( * ) Notice: Subject to any disclaimer, the term of this patent is extended or adjusted under 35 U.S.C. 154(b) by 213 days.

(21) Appl. No.: 16/883,587

(22) Filed: May 26, 2020

(65) Prior Publication Data

US 2020/0282811 A1    Sep. 10, 2020

Related U.S. Application Data

(62) Division of application No. 15/812,622, filed on Nov. 14, 2017, now Pat. No. 10,675,955.

(Continued)

(51) Int. Cl.
*G06K 9/34* (2006.01)
*H04N 5/232* (2006.01)
(Continued)

(52) U.S. Cl.
CPC .............. *H04N 5/232* (2013.01); *B60J 3/04* (2013.01); *G02F 1/13725* (2013.01);
(Continued)

(58) Field of Classification Search
None
See application file for complete search history.

(56) References Cited

U.S. PATENT DOCUMENTS 6,088,612 A       7/2000  Blair
6,650,336 B2 *  11/2003  Suzuki ................ H04N 1/6025
                                                                358/1.9
(Continued)

FOREIGN PATENT DOCUMENTS

WO      1999/038121    7/1999
WO      2015/082572    6/2015

OTHER PUBLICATIONS

Gupta et al., "Dynamic illumination based system to remove the glare and improve the quality of medical images," 2013 35th Annual International Conference of the IEEE Engineering in Medicine and Biology Society (EMBC), 2013, pp. 3020-3023, doi: 10.1109/EMBC.2013.6610176. (Year: 2013).*

(Continued)

*Primary Examiner* — Feng Niu
(74) *Attorney, Agent, or Firm* — IP Spring

(57) ABSTRACT

Some implementations relate to determining whether glare is present in captured image(s) of an object (e.g., a photo) and/or to determining one or more attributes of any present glare. Some of those implementations further relate to adapting one or more parameters for a glare removal process based on whether the glare is determined to be present and/or based on one or more of the determined attributes of any glare determined to be present. Some additional and/or alternative implementations disclosed herein relate to correcting color of a flash image of an object (e.g., a photo). The flash image is based on one or more images captured by a camera of a client device with a flash component of the client device activated. In various implementations, correct- (Continued)

ing the color of the flash image is based on a determined color space of an ambient image of the object.

19 Claims, 17 Drawing Sheets

Related U.S. Application Data

(60) Provisional application No. 62/422,559, filed on Nov. 15, 2016, provisional application No. 62/421,953, filed on Nov. 14, 2016.

(51) Int. Cl.
| | | |
|---|---|---|
| *B60J 3/04* | (2006.01) | |
| *G02F 1/1333* | (2006.01) | |
| *G02F 1/137* | (2006.01) | |
| *H04N 5/00* | (2011.01) | |
| *H04N 1/60* | (2006.01) | |
| *G06T 5/00* | (2006.01) | |
| *H04N 1/38* | (2006.01) | |
| *G06T 5/50* | (2006.01) | |
| *H05B 45/20* | (2020.01) | |

(52) U.S. Cl.
CPC ........ *G02F 1/133362* (2013.01); *G06T 5/005* (2013.01); *G06T 5/50* (2013.01); *H04N 1/38* (2013.01); *H04N 1/6086* (2013.01); *H04N 5/00* (2013.01); *H05B 45/20* (2020.01); *G06T 2207/10152* (2013.01); *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 7,346,184 B1 | 3/2008 | Carr et al. | |
| 7,423,658 B1* | 9/2008 | Uomori | G06T 7/586 |
| | | | 345/660 |
| 7,457,477 B2* | 11/2008 | Petschnigg | G06T 5/50 |
| | | | 382/209 |
| 7,590,344 B2* | 9/2009 | Petschnigg | H04N 9/735 |
| | | | 396/155 |
| 8,805,125 B1 | 8/2014 | Kumar et al. | |
| 8,976,264 B2* | 3/2015 | Rivard | H04N 5/2256 |
| | | | 382/168 |
| 9,036,044 B1* | 5/2015 | Bae | G06T 7/33 |
| | | | 348/222.1 |
| 9,270,885 B2 | 2/2016 | Rapoport et al. | |
| 9,325,861 B1 | 4/2016 | Ettinger | |
| 9,406,147 B2* | 8/2016 | Rivard | H04N 5/2354 |
| 9,600,927 B1* | 3/2017 | Poursohi | G06T 17/00 |
| 9,692,995 B2 | 6/2017 | Tico et al. | |
| 9,626,589 B1 | 8/2017 | Graham et al. | |
| 9,803,811 B2* | 10/2017 | Jou | F21V 3/00 |
| 10,027,906 B2* | 7/2018 | Niitsuma | H04N 1/00888 |
| 10,223,775 B2 | 3/2019 | Swami et al. | |
| 10,257,485 B2 | 4/2019 | Winn et al. | |
| 10,791,319 B1* | 9/2020 | Chui | G06T 17/00 |
| 11,212,510 B1* | 12/2021 | Chui | G06T 17/00 |
| 2001/0033288 A1* | 10/2001 | Nabeshima | H04N 1/6025 |
| | | | 345/601 |
| 2002/0008709 A1* | 1/2002 | Suzuki | H04N 1/6025 |
| | | | 345/593 |
| 2003/0156837 A1* | 8/2003 | Ikeda | H04N 1/6086 |
| | | | 396/564 |
| 2004/0105261 A1* | 6/2004 | Ducharme | F21V 23/045 |
| | | | 362/231 |
| 2005/0025357 A1* | 2/2005 | Landwehr | A01M 1/145 |
| | | | 382/224 |
| 2005/0264836 A1* | 12/2005 | Gotoh | H04N 1/6019 |
| | | | 358/1.9 |
| 2006/0008171 A1* | 1/2006 | Petschnigg | G06T 5/50 |
| | | | 382/254 |
| 2006/0077487 A1* | 4/2006 | Bevans | H04N 1/6033 |
| | | | 358/504 |
| 2007/0025717 A1* | 2/2007 | Raskar | H04N 5/2354 |
| | | | 348/E5.038 |
| 2007/0153020 A1* | 7/2007 | Inoue | H04N 1/6019 |
| | | | 345/591 |
| 2007/0201853 A1* | 8/2007 | Petschnigg | G06T 5/50 |
| | | | 348/E5.038 |
| 2008/0180473 A1* | 7/2008 | Gardner | B41J 29/393 |
| | | | 326/37 |
| 2010/0124041 A1* | 5/2010 | Druchinin | H04N 5/2256 |
| | | | 362/16 |
| 2011/0141500 A1* | 6/2011 | Togami | H04N 1/56 |
| | | | 358/1.9 |
| 2012/0230595 A1* | 9/2012 | Kubo | H04N 19/80 |
| | | | 382/232 |
| 2013/0062536 A1* | 3/2013 | Bardos | G01N 21/9501 |
| | | | 250/459.1 |
| 2013/0329073 A1* | 12/2013 | Majewicz | G06T 5/50 |
| | | | 348/222.1 |
| 2013/0329132 A1 | 12/2013 | Tico et al. | |
| 2014/0167646 A1* | 6/2014 | Zukauskas | H05B 45/20 |
| | | | 315/297 |
| 2014/0176757 A1* | 6/2014 | Rivard | G06T 7/90 |
| | | | 348/E9.051 |
| 2014/0253545 A1* | 9/2014 | Sullivan | G06T 11/001 |
| | | | 345/419 |
| 2015/0063720 A1* | 3/2015 | Maltz | H04N 1/00997 |
| | | | 382/284 |
| 2015/0093044 A1* | 4/2015 | Feder | G06T 5/50 |
| | | | 382/284 |
| 2015/0098651 A1* | 4/2015 | Rivard | H04N 9/735 |
| | | | 382/167 |
| 2016/0231573 A1* | 8/2016 | Mullins | H05B 47/11 |
| 2016/0307035 A1* | 10/2016 | Schilling | G06V 10/44 |
| 2017/0201697 A1* | 7/2017 | Niitsuma | H04N 1/00891 |
| 2017/0211755 A1* | 7/2017 | Jou | F21K 9/60 |
| 2017/0252579 A1* | 9/2017 | Kilby | A61N 5/1071 |
| 2017/0337297 A1* | 11/2017 | Hu | G06F 30/00 |
| 2017/0368210 A1* | 12/2017 | David | H05B 33/14 |
| 2018/0039846 A1 | 2/2018 | Grubb et al. | |
| 2018/0075587 A1* | 3/2018 | Swami | G06T 5/50 |
| 2018/0130197 A1 | 5/2018 | Weiss et al. | |
| 2019/0101252 A1* | 4/2019 | Renders | H05B 45/20 |

OTHER PUBLICATIONS

EPO, Communication Pursuant to Article 94(3) EPC for European Patent Application No. 16801683.0, dated May 20, 2021, 5 pages.
"Scan Documents with CamScanner", Retrieved from the Internet: https://features.en.softonic.com/scan-documents-with-camscanner, Jul. 28, 2014, 10 pages.
Andrade, et al., "A video-based support system for nighttime navigation in semi-structured environments", Proceedings of the 17th Brazilian Symposium on Computer Graphics and Image Processing, 2004, pp. 178-185.
Koreban, et al., "Geometry by deflaring", 2009 IEEE International Conference on Computational Photography (ICCP), 2009, pp. 1-8.
USPTO, Notice of Allowance for U.S. Appl. No. 15/812,622, dated Jan. 30, 2020, 11 pages.
USPTO, Non-final Office Action for U.S. Appl. No. 16/374,647, dated Jun. 21, 2019, 11 pages.
USPTO, Restriction Requirement for U.S. Appl. No. 15/350,840, dated Mar. 9, 2018, 6 pages.
USPTO, Non-final Office Action for U.S. Appl. No. 15/350,840, dated May 17, 2018, 12 pages.
USPTO, Notice of Allowance for U.S. Appl. No. 15/350,840, dated Nov. 21, 2018, 9 pages.
USPTO, Non-final Office Action for U.S. Appl. No. 15/812,622, dated Oct. 16, 2019, 12 pages.
USPTO, Notice of Allowance for U.S. Appl. No. 16/374,647, dated Oct. 2, 2019, 7 pages.

(56) References Cited

OTHER PUBLICATIONS

WIPO, International Preliminary Report on Patentability for International Patent Application No. PCT/US2016/061848, dated Dec. 11, 2018, 14 pages.
WIPO, International Search Report and Written Opinion for International Patent Application No. PCT/US2016/061848, dated Feb. 10, 2017, 20 pages.
WIPO, Written Opinion of the International Preliminary Examining Authority for International Patent Application No. PCT/US2016/061848, dated Jul. 31, 2018, 12 pages.
WIPO, Written Opinion of the International Preliminary Examining Authority for International Patent Application No. PCT/US2016/061848, dated May 15, 2018, 13 pages.

* cited by examiner

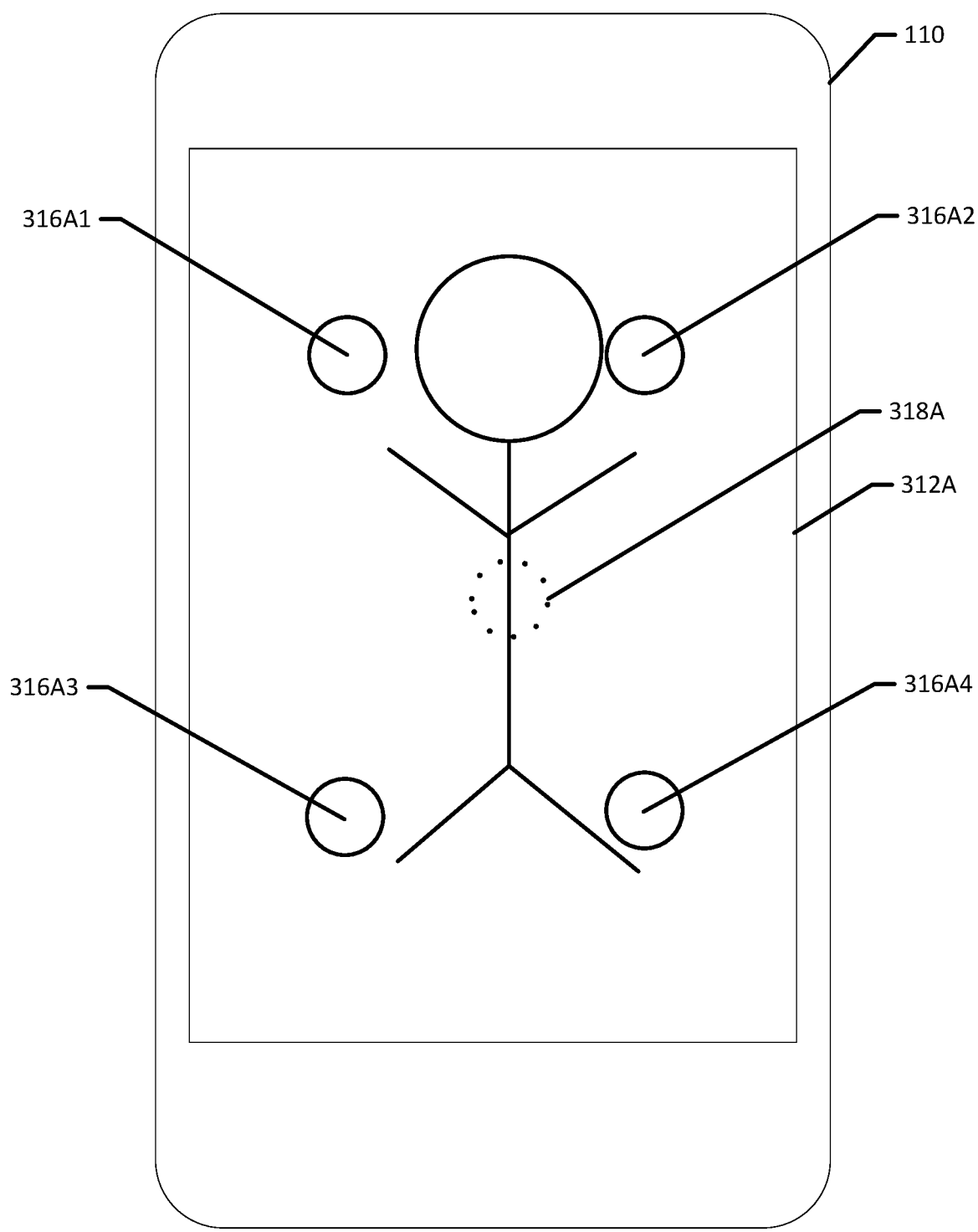
FIG. 3A1

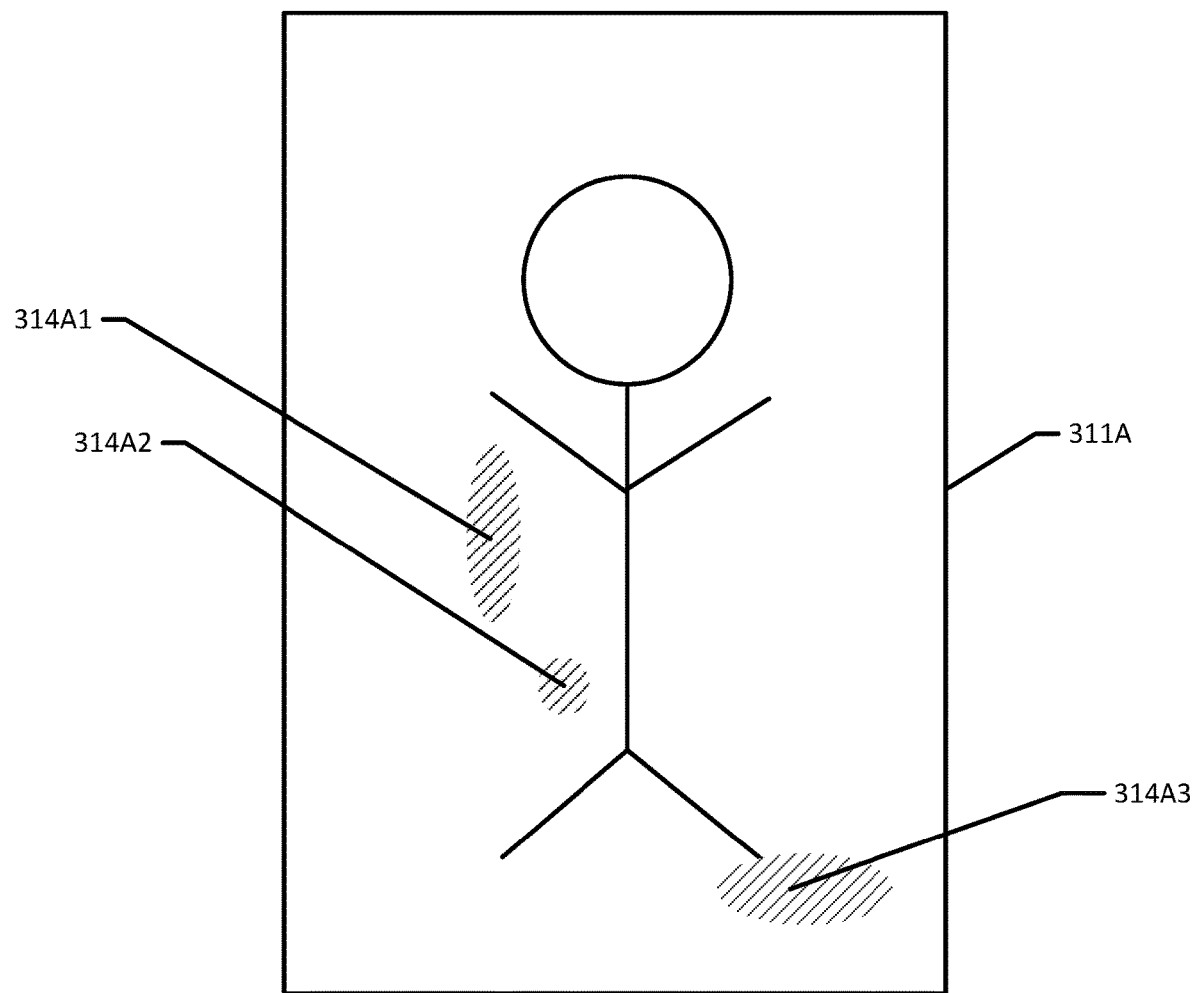
FIG. 3A2

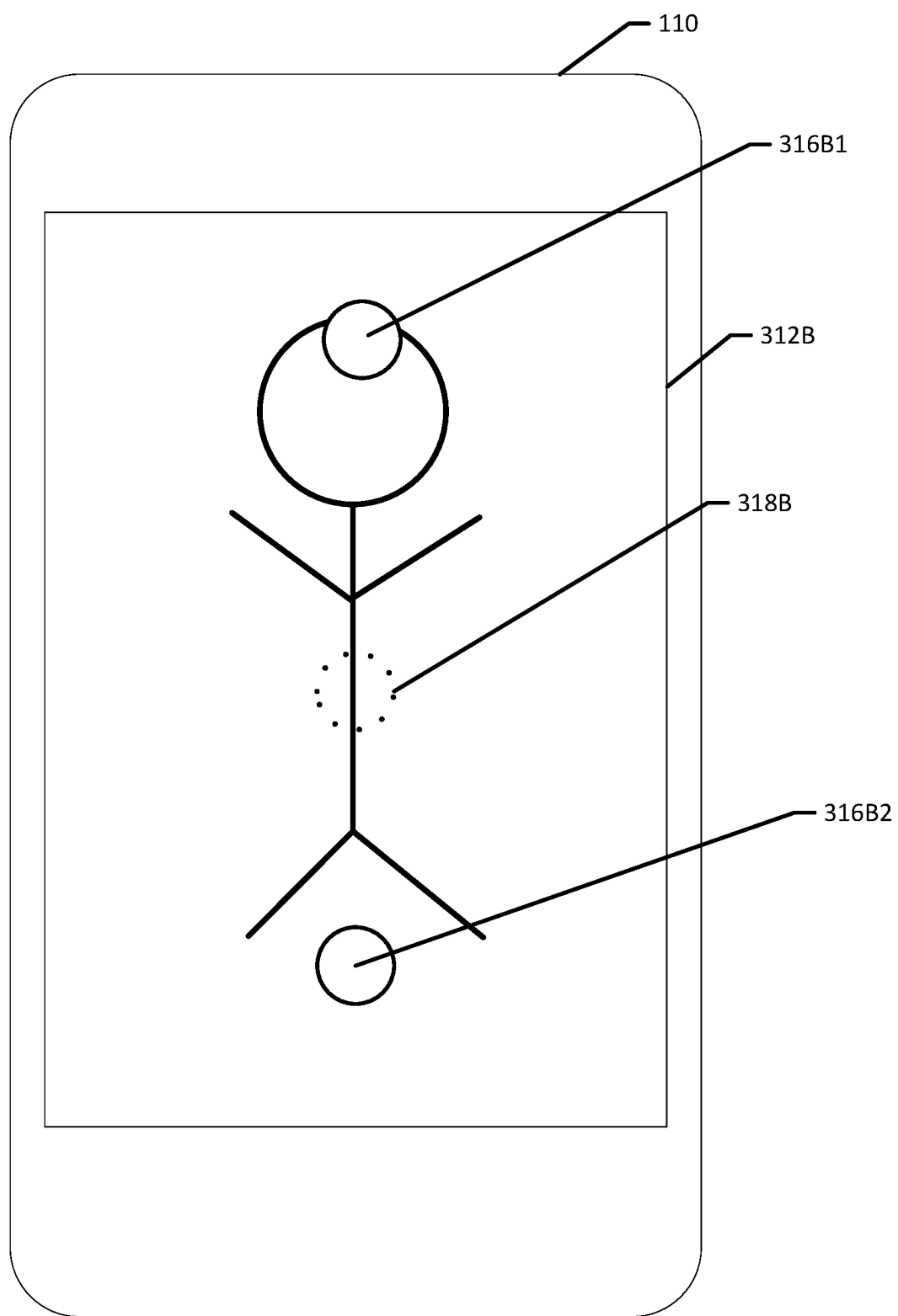
FIG. 3B1

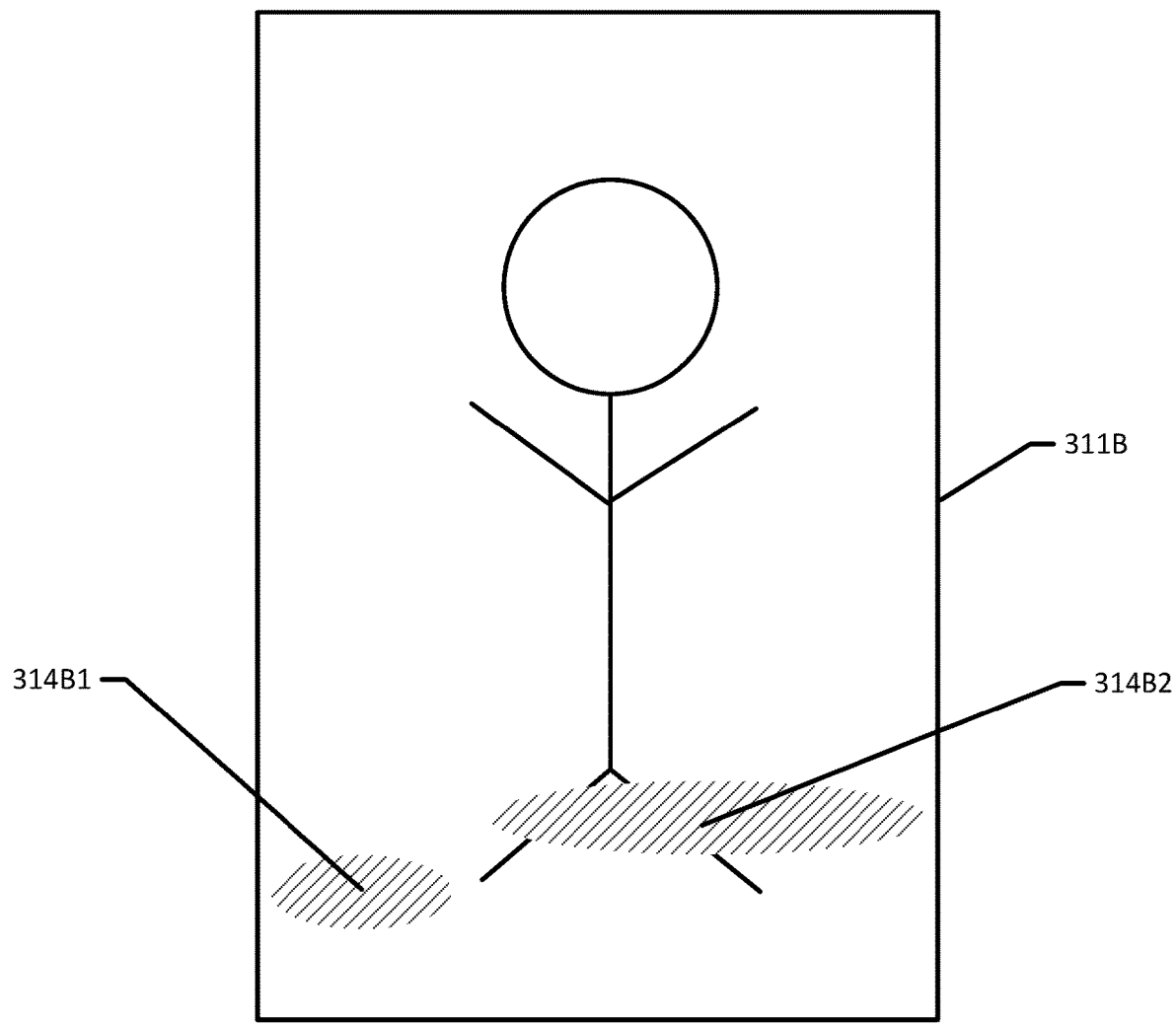
FIG. 3B2

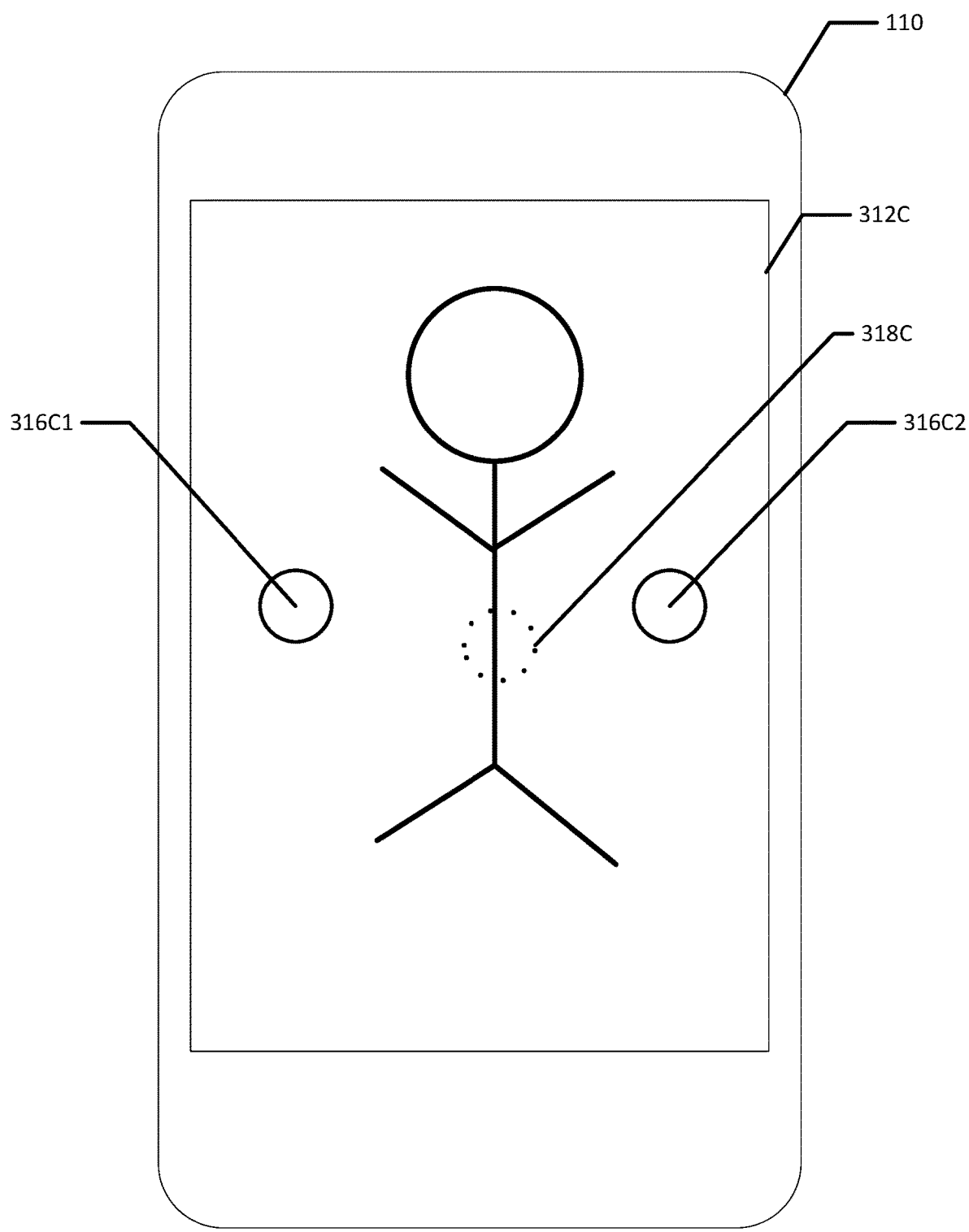
FIG. 3C1

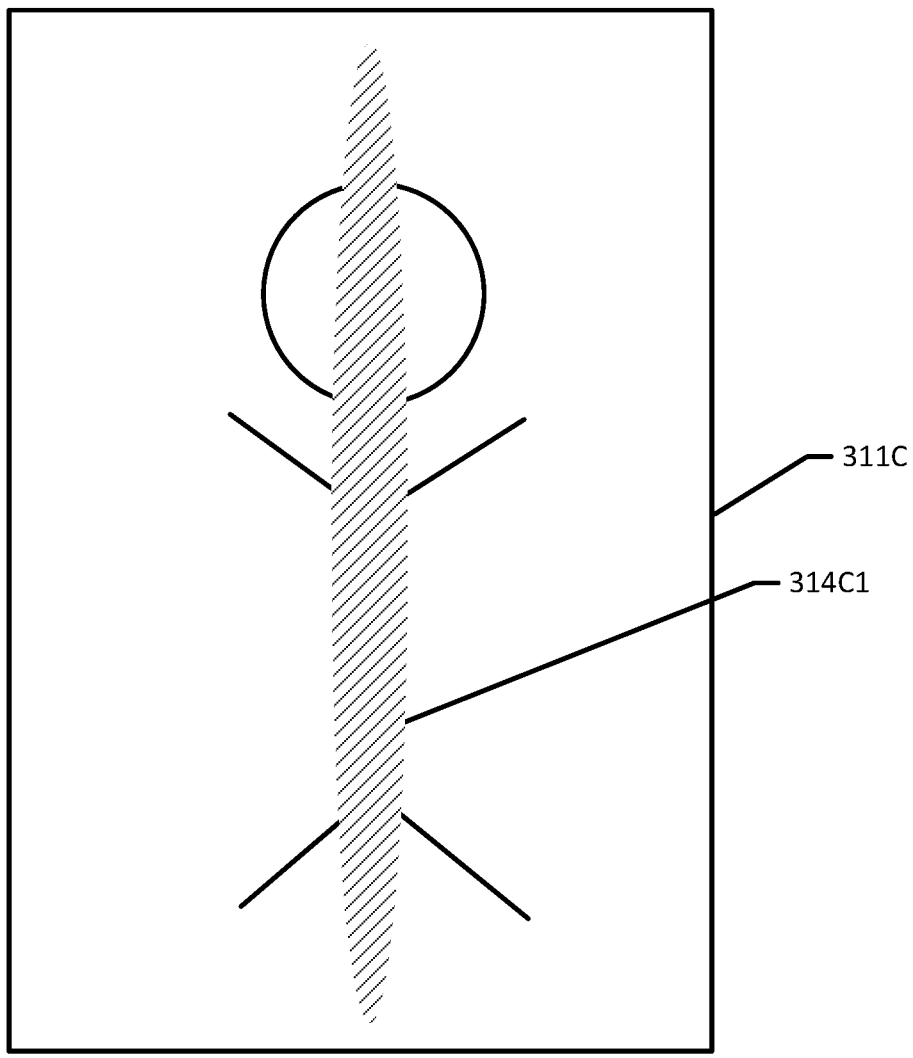
FIG. 3C2

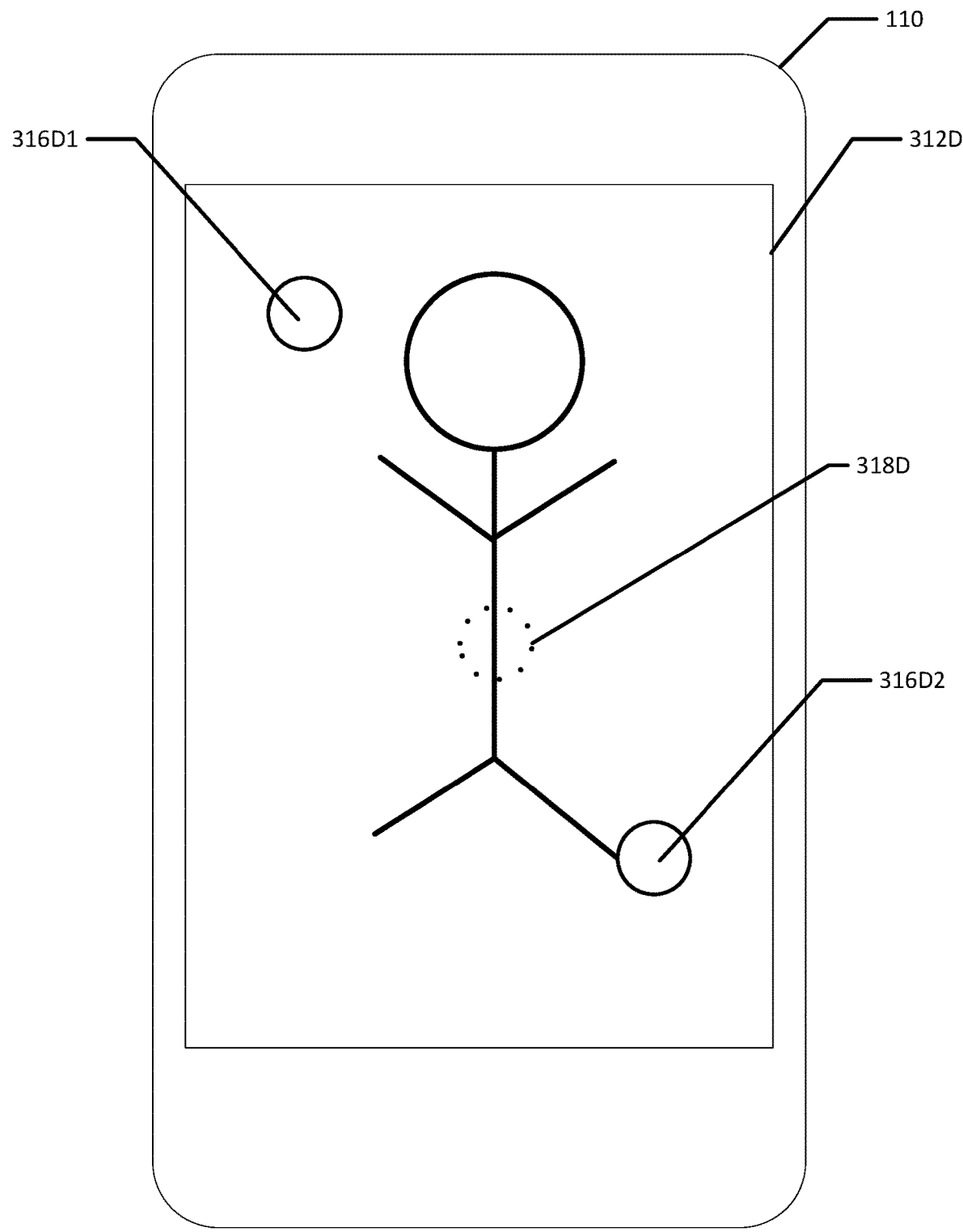
FIG. 3D1

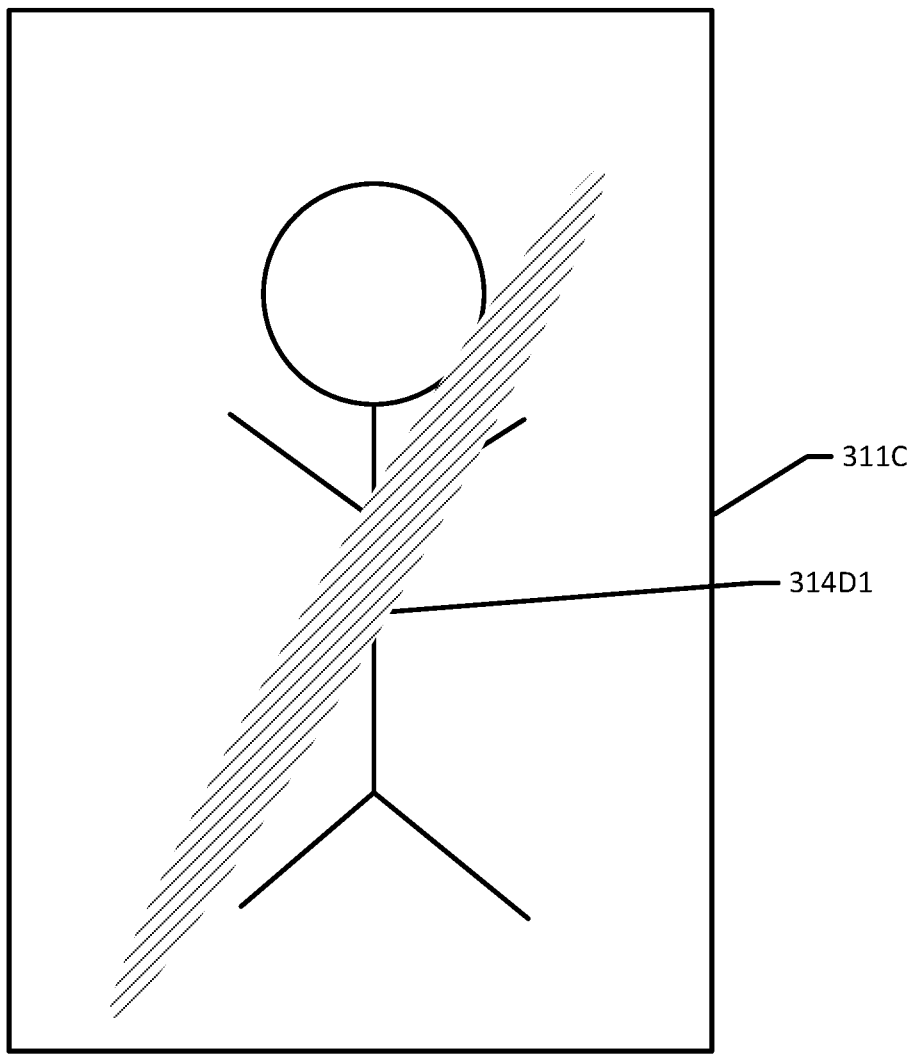
FIG. 3D2

ADAPTIVE GLARE REMOVAL AND/OR COLOR CORRECTION

CROSS REFERENCE TO RELATED APPLICATIONS

This application is a divisional of U.S. patent application Ser. No. 15/812,622, filed Nov. 14, 2017 and titled ADAPTIVE GLARE REMOVAL AND/OR COLOR CORRECTION, which claims the benefit of U.S. Provisional Application No. 62/422,559, filed Nov. 15, 2016 and titled ADAPTIVE GLARE REMOVAL, and also claims the benefit of U.S. Provisional Application No. 62/421,953, filed Nov. 14, 2016 and titled COLOR CORRECTION OF AN IMAGE SCANNED USING FLASH, the contents of all of which are incorporated by reference herein in their entirety for all purposes.

BACKGROUND

There has been widespread adoption of various client devices that incorporate camera(s), such as smart phones and tablets. Such client devices can each operate at least one corresponding image capturing application that enables a user of the client device to capture various digital images via the camera(s) of the client device. However, for various objects and/or in various conditions, captured digital images may have one or more undesirable characteristics. For example, a captured image of a photo with a reflective (e.g., glossy) surface can include undesirable reflective glare that obfuscates one or more portions of the photo in the captured image. The reflective glare can be a result of light source(s) in the environment of the client device (e.g., lamps and/or windows) and/or can be a result of light produced by the client device, such as light from a flash component of the client device. As another example, a captured image of a photo can additionally and/or alternatively fail to capture color composition and/or image quality of the photo with a desirable degree of accuracy.

SUMMARY

Some implementations disclosed herein relate to determining whether glare is present in captured image(s) of an object (e.g., a photo) and/or to determining one or more attributes of any present glare. Some of those implementations further relate to adapting one or more parameters for a glare removal process based on whether the glare is determined to be present and/or based on one or more of the determined attributes of any glare determined to be present. The glare removal process can include capturing one or more further images of the object, where the one or more further images are captured with the camera being at pose(s), relative to the object, that are different than pose(s) of the camera for the image(s) captured prior to the further image(s). The glare removal process can further include generating, based on one or more of the image(s) and based on one or more of the further image(s), a composite image that mitigates glare. For example, the glare removal process can include generating the composite image based on at least a first portion of one of the image(s), and based on at least a second portion of one of the further image(s). For instance, the second portion of the one further image can correspond to a portion of the object that is obfuscated by glare in the one image. Also, for instance, the first portion of the one image can correspond to a portion of the object that is obfuscated by glare in the one further image. As described herein, the glare removal process can result in a composite image that mitigates glare. The composite image can fully mitigate (i.e., fully remove) glare on a photo or other target object of the composite image, or can partially mitigate (i.e., lessen the extent of, but not fully remove) glare on the target object of the composite image. Accordingly, as used herein, "glare removal" includes fully mitigating glare or partially mitigating glare.

In various implementations, the glare removal process includes providing user interface output that directs a user of the client device to adjust the camera to the pose(s) at which the further image(s) are captured. In some of those various implementations, adapting the glare removal process can include adapting the user interface output to direct the user to adjust the client device to a quantity of pose(s), and/or to pose location(s), where the quantity and/or location(s) are determined based on whether the glare is present and/or based on one or more of the attributes of any present glare. In these and other manners, the number of further image(s) captured, and/or the extent to which a user must adjust the pose of the camera, can be dependent on determined attribute(s) of glare, such as a quantity of glare components, size(s) of the glare component(s), magnitude(s) of the glare in the glare component(s), direction(s) of the glare component(s), etc. For example, when a single small glare component is detected, the user may be directed to adjust the camera to relatively few additional poses (e.g., only one or two), whereas the user may be directed to adjust the camera to relatively many additional poses (e.g., three or four, or more) when multiple large glare components are detected. Accordingly, in situations in which the glare removal process is adapted to direct the user to a reduced number of additional poses, various computational resources can be reduced (relative to techniques that require the user to always adjust the camera to a same number of further poses). For example, with the reduced number of further poses the client device can experience less "screen-on" time, can capture fewer images, and/or can perform less processing (e.g., as a result of capturing and/or combining fewer "further images"). Further, user experience is improved in situations in which the user is directed to move the camera to a reduced number of poses.

As one particular example, the user interface output can include one or more graphical indicia to guide the capture of the images. The graphical indicia can be rendered in a graphical interface of a display screen of the client device, and can be rendered in the graphical interface along with (e.g., superimposed on) sensor data captured by the camera. For example, the graphical interface can be rendered by an application and can include an electronic viewfinder for the camera, and can include the graphical indicia superimposed over a "real time" feed of sensor data captured by the camera. The indicia can include, for example, at least one reference indicia and one or more target indicia. The reference indicia can be rendered in a fixed location within the viewfinder (e.g., centered in the viewfinder), and the target indicia can be rendered non-fixed within the viewfinder (but relatively fixed relative to object(s) rendered in the sensor data captured by the camera). In this manner, a user can adjust the pose of the client device to cause the target indicia to sequentially move, in the graphical interface, to each of the one or more target indicia. Additional image(s) can be captured when the reference indicia is at or near each of the target indicia, thereby enabling the capture of the additional image(s) at one or more additional poses. Again, the quantity and/or position(s) of the target indicia can be adapted based on one or more attributes of any present glare (e.g., position(s) of detected glare component(s))—thereby adapting the glare removal process based on attribute(s) of any present glare.

In some implementations, when it is determined that the glare removal process should not be performed, e.g. when one or more attributes of glare detected in the image do not satisfy threshold(s), the glare removal process is adapted by bypassing of the glare removal process. For example, if it is determined, based on a captured image, that the glare removal process should not be performed, the captured image can be utilized as a "final image" to be automatically stored in one or more non-transitory media (e.g., stored in non-dynamic media), or stored following a confirmatory user interface input. Also, for example, the captured image can be used as an ambient image or a flash image (dependent upon whether it was captured when a flash component was activated), in generating a color corrected image according to implementations disclosed herein. In implementations where the glare removal process is selectively bypassed, computational resources can be reduced (relative to techniques that always require performance of a glare removal process), and user experience can be improved.

Some additional and/or alternative implementations disclosed herein relate to correcting color of a flash image of an object (e.g., a photo). The flash image is based on one or more images captured by a camera of a client device with a flash component of the client device activated. For example, the flash image can be a single flash image captured by the camera. As an alternative example, the flash image can be a composite image that is based on multiple separate flash images. For instance, the flash image can be a composite image generated, based on multiple flash images, according to a glare removal process as described herein. In various implementations, correcting the color of the flash image is based on a determined color space of an ambient image of the object. The ambient image is based on one or more images captured by the camera of the client device without a flash component of the device activated (thus relying on only ambient light source(s)). For example, the ambient image can be a single ambient image. As an alternative example, the ambient image can be a composite image that is based on multiple separate ambient images. For instance, the ambient image can be a composite image generated, based on multiple ambient images, according to a glare removal process as described herein (to mitigate glare from ambient light source(s)). Color correcting a flash image based on a determined color space of an ambient image, can enable effective "borrowing" of more authentic color data or color space from the ambient image, while preserving the higher saturation of the flash image. Accordingly, a color corrected image of a photo, generated through color correcting techniques disclosed herein, can have portion(s) with color that is more accurate to the color of the photo than are the corresponding portions of the flash image—and can have portion(s) with greater saturation than the corresponding portions of the ambient image.

In some implementations, a method implemented by one or more processors is provided and includes receiving at least one image captured by a camera of a client device. The image captures a photo in a field of view of the camera. The method further includes processing the image to determine that the image includes one or more glare components. The method further includes, based on determining that the image includes one or more glare components: adapting a graphical interface rendered on a display of the client device. Adapting the graphical interface includes providing one or more indicia to guide capture of at least one further image of the photo by the camera of the client device. The method further includes receiving the at least one further image captured by the camera of the client device and generating a composite image that mitigates glare. Generating the composite image includes generating the composite image based on at least a first portion of the image and based on at least a second portion of the further image.

These and other implementations of the technology described herein can include one or more of the following features.

In some implementations, the method further includes, subsequent to generating the composite image: receiving at least one additional image captured by the camera of the client device, where the additional image captures an additional photo; processing the additional image to determine that the additional image lacks any glare component; and based on determining that the additional image lacks any glare component: bypassing adapting of the graphical interface to guide capture of any further images of the additional photo.

In some implementations, processing the image further includes processing the image to determine one or more attributes of the one or more glare components, and adapting the graphical interface is based on the one or more attributes of the one or more glare components. In some versions of those implementations, adapting the graphical interface based on the one or more attributes of the one or more glare components includes one or both of: determining a quantity of the one or more indicia to provide; and determining a corresponding location for each of the one or more indicia. In some additional or alternative versions of those implementations: the one or more attributes of the one or more glare components include one or more locations for the one or more glare components; and/or processing the image includes processing the image utilizing one or more trained machine learning models to generate output that indicates the one or more attributes of the one or more glare components.

In some implementations, processing the image to determine that the image includes one or more glare components include determining whether a brightness differential between one or more neighboring pixels in the image exceeds a threshold.

In some implementations, the image and the further image are captured when a flash component of the client device is activated, and the composite image is generated based on only flash based images. In some of those implementations, the method further includes: determining a color space based on an ambient image of the photo, where the ambient image is generated based on one or more ambient images capturing the photo and captured by the camera when the flash component is not activated; and generating a color corrected image based on the composite image and the color space. In some versions of those implementations, generating the color corrected image based on the composite image and the color space includes: utilizing a three-dimensional lookup table to map the color space from the ambient image to the color corrected image. In some additional and/or alternative versions of those implementations, the method further includes determining an alignment of the ambient image and the flash image, and generating the color corrected image is also based on the alignment of the ambient image and the flash image.

In some implementations, a method implemented by one or more processors is provided and includes receiving an ambient image of a photo and receiving a flash image of the photo. The ambient image is based on one or more images each captured by a camera of a client device without a flash component of the client device activated. The flash image is based on one or more flash images captured by the camera of the client device with the flash component of the client device activated. The method further includes determining a color space of the ambient image, generating a color corrected image based on the color space, and presenting the color corrected image using the client device.

These and other implementations of the technology described herein can include one or more of the following features.

In some implementations, generating the color corrected image includes modifying the flash image based on the color space.

In some implementations, the method further includes determining an image quality of the flash image, and generating the color corrected image is further based on the image quality.

In some implementations, the method further includes determining an alignment of the flash image and the ambient image, and generating the color corrected image is also based on the alignment of the ambient image and the flash image.

In some implementations, the method further includes: determining a quality of light scattered by the photo based on the ambient image; and determining, based on the quality of the light, a brightness level for the flash component in capturing at least one of the one or more flash images captured by the camera of the client device with the flash component of the client device activated.

In some implementations, generating the color corrected image uses a three-dimensional lookup table to globally map a color space from the ambient image to the flash image.

In some implementations, the method further includes generating the flash image based on a plurality of the one or more flash images captured by the camera of the client device. In some of those implementations, a given flash image, of the plurality of the one or more flash images, is captured following human adjustment, of a pose of the client device, in response to user interface output rendered at the client device to direct the adjustment. in some of those implementations, the method further include: rendering the user interface output in response to determining that a prior flash image includes a glare component, the prior flash image being an additional one of the one or more flash images, and being captured prior the given flash image.

In some implementations, generating the color corrected image comprises borrowing image data from the ambient image to compensate for image highlights in one or more regions of the flash image.

In some implementations, a method implemented by one or more processors is provided and includes receiving an image of an object, where the image includes a reflection overlapping at least a portion of the object. The method further includes determining at least one attribute of the reflection, configuring at least one parameter of a glare removal process based at least in part on the at least one attribute of the reflection, and performing the glare removal process using the at least one configured parameter In some implementations, a method implemented by one or more processors is provided and includes receiving an image of an environment, and determining an amount of a reflection component in the image. The method further includes performing a reflection removal process to remove the reflection component from the image when the amount of the reflection component in the image satisfies a threshold. The method further includes providing the image with the reflection component removed when the removal process is performed, and otherwise providing the image without reflection removal processing.

In some implementations, a method implemented by one or more processors is provided and includes receiving an image of an object, determining whether the image includes a glare component, and bypassing a glare removal process when the image is exclusive of the glare component.

In some implementations, a method implemented by one or more processors is provided and includes receiving a first image of a photograph captured at ambient conditions, receiving a second image of the photograph captured using a flash, determining a color space of the first image, determining an image quality of the second image, determining an alignment of the first image and the second image, generating a color corrected image based on the color space and the image quality, and presenting the color corrected image.

In some implementations, a method implemented by one or more processors is provided and includes receiving a first image of a photograph captured at ambient conditions, receiving a second image of the photograph captured using a flash, determining a color space of the first image, determining an image quality of the second image, determining an alignment of the first image and the second image, generating a color corrected image based on the color space and the image quality, and presenting the color corrected image.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A1 illustrates an example client device displaying an example graphical interface that can be presented in response to capture of an image shown in FIG. 3A2.

FIG. 3A2 illustrates an image of a photo, with corresponding glare components.

FIG. 3B1 illustrates an example client device displaying an example graphical interface that can be presented in response to capture of an image shown in FIG. 3B2.

FIG. 3B2 illustrates another image of a photo, with corresponding glare components.

FIG. 3C1 illustrates an example client device displaying an example graphical interface that can be presented in response to capture of an image shown in FIG. 3C2.

FIG. 3C2 illustrates another image of a photo, with corresponding glare components.

FIG. 3D1 illustrates an example client device displaying an example graphical interface that can be presented in response to capture of an image shown in FIG. 3D2.

FIG. 3D2 illustrates another image of a photo, with corresponding glare components.

DETAILED DESCRIPTION

Figure 1:
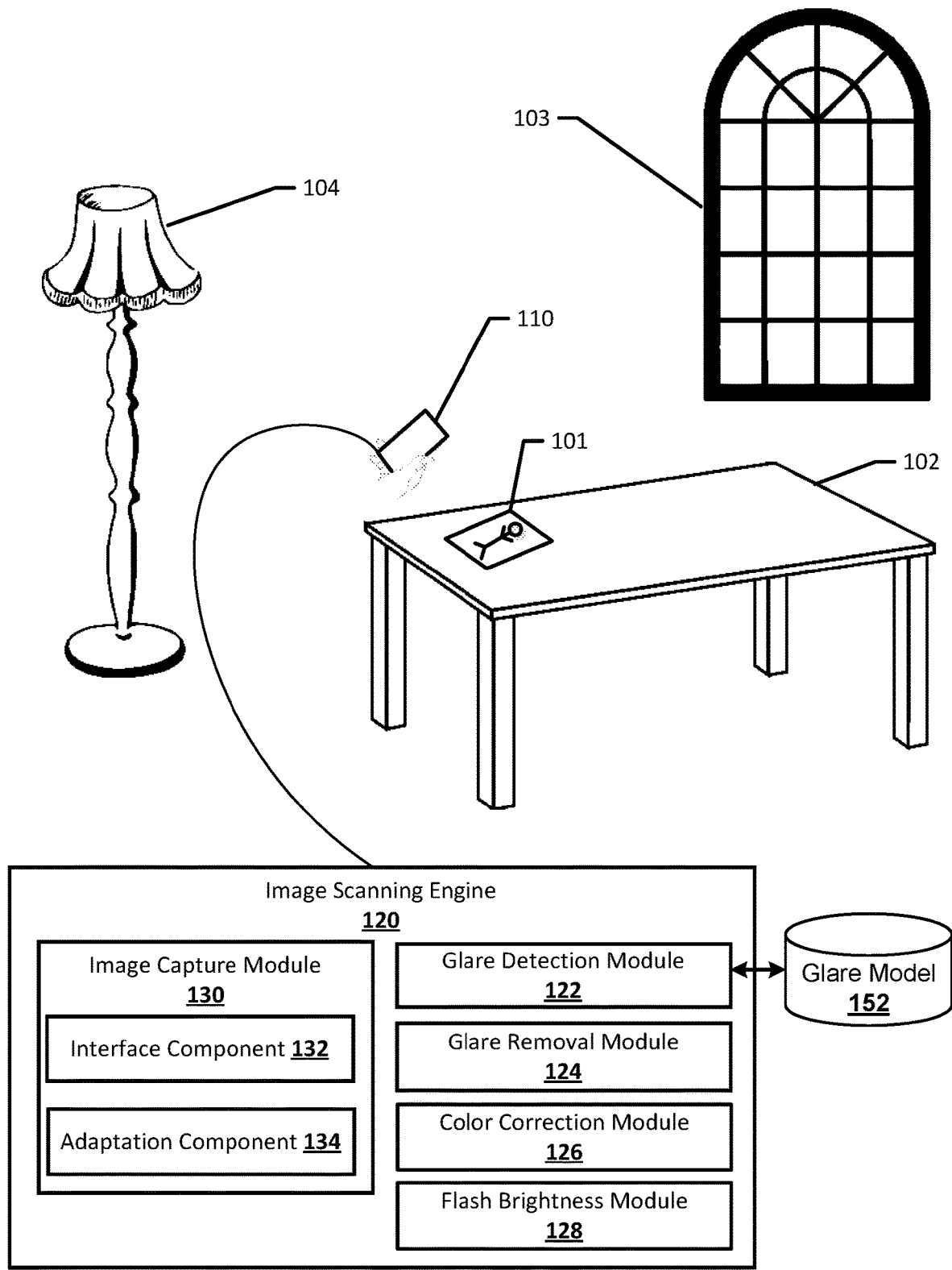
FIG. 1 illustrates an example environment in which implementations disclosed herein may be implemented.

Some implementations disclosed herein relate to determining whether glare is present in captured image(s) of an object (e.g., a photo) and/or to determining one or more attributes of any present glare. Some of those implementations further relate to adapting one or more parameters for a glare removal process based on whether the glare is determined to be present and/or based on one or more of the determined attributes of any glare determined to be present. In some of the implementations where parameters for a glare removal process are adapted, a captured image of an object is received and the location and amount of glare in the captured image is detected. The object may be, for example, a photograph (also referred to herein as a photo) and/or another object that has a reflective and/or glossy surface. Some versions of those implementations utilize location(s) and/or amount(s) of glare detected in the captured image to determine whether a glare removal process should be performed with respect to the captured image. The glare removal process may include capturing one or more additional images of the object, e.g., from different poses relative to the object, and stitching or otherwise the captured images to generate a composite image that mitigates glare (e.g., composite image that does not have glare).

In situations where it is determined that the glare removal process should be performed, such as when the amount of glare detected in the captured image satisfies a threshold, the location(s) and/or amount(s) of the glare detected in the captured image may be used by the subject system to configure one or more parameters associated with the glare removal process, such as the number of additional images to capture, the positioning relative to the object for each of the additional images, etc. In situations where it is determined that the glare removal process should not be performed, e.g. when the amount of glare detected in the image does not satisfy the threshold, the glare removal process is bypassed.

Thus, implementations allow glare to be efficiently and effectively mitigated from captured images. Those and other implementations substantially minimize the latency, processing resources, power resources, and/or user interaction associated with mitigating glare from captured images, as well as allowing the glare removal process to be bypassed entirely when appropriate.

Some additional and/or alternative implementations disclosed herein relate to correcting color of a flash image of an object (e.g., a photo). The flash image is based on one or more images captured by a camera of a client device with a flash component of the client device activated. In various implementations, correcting the color of the flash image is based on a determined color space of an ambient image of the object. The ambient image is based on one or more images captured by the camera of the client device without a flash component of the device activated. Color correcting a flash image based on a determined color space of an ambient image, can enable effective "borrowing" of more authentic color data or color space from the ambient image, while preserving the higher saturation of the flash image. Accordingly, a color corrected image of a photo, generated through color correcting techniques disclosed herein, can have portion(s) with color that is more accurate to the color of the photo than are the corresponding portions of the flash image—and can have portion(s) with greater saturation than the corresponding portions of the ambient image.

FIG. 1 illustrates an example environment in which implementations disclosed herein may be implemented. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example environment of FIG. 1 includes a photo 101 atop a table 102. The example environment also includes a client device 110, which is illustrated as a smart phone in FIG. 1. A user's hand is depicted holding the client device 110, and positioning the client device 110 such that an image capture device (e.g., a camera) of the client device 110 is directed toward the photo 101, and captures the photo 101 in a field of view of the image capture device. Additional and/or alternative client devices can be utilized, such as a laptop or desktop computer, a digital camera, a tablet device, a wearable device (e.g., eyeglasses or a watch that has one or more processors coupled thereto and/or embedded therein), a television or other displays with one or more processors coupled thereto and/or embedded therein, or other appropriate computing devices that can be used to capture an image of the photo 101. In some implementations, the client device 110 (or other client device), can include all or parts of the example computer system of FIG. 8, described in more detail below.

An image scanning engine 120 is also illustrated in FIG. 1. In some implementations, the image scanning engine 120 is implemented, in whole or in part, by the client device 110. For example, the client device 110 may implement the entirety of the image scanning engine 120, and can optionally locally store a glare model 152 that is optionally utilized by the image scanning engine 120. In some implementations, the image scanning engine 120 is implemented at least in part by one or more computing devices that are remote from the client device 110, and that communicate with the client device 110 via one or more networks. For example, in some of those implementations one or more (e.g., all) aspects of the image scanning engine 120 can be implemented by remote "server-side" computing devices and can interact with the client device 110 via one or more networks. For instance, all or aspects of the image capture module 130 of the image scanning engine 120 can be performed by the client device 110, and all or portions of module(s) 122, 124, 126, and/or 128 can be performed server-side based on image(s) and/or other data transmitted by the client device 110 (with permission from a use of the client device 110)—and the server-side component(s) can transmit commands to the client device 110 to cause the image capture module 130 to adapt various outputs and/or can transmit a "final image" that is generated server-side base on captured image(s). The one or more networks can include, for example, a public communication network (such as the Internet, cellular data network, dialup modems over a telephone network) or a private communications network (such as private local area network ("LAN"), leased lines).

The example environment includes ambient light sources, such as a lamp 104 and a window 103, either (or both) of which may provide ambient light that can serve as a source for glare on captured image(s) of the photo 101. Additional and/or alternative "ambient" sources of glare can be provided in other environments. Light emitted by the client device 110 can also serve as a source for glare on captured image(s) of the photo 101. For example, the client device 110 can include a flash component that is at least selectively activated when some images are taken via a camera of the client device and, when activated, the flash component can generate light that causes glare to appear on a captured image of the photo 101. It is noted that, although a photo 101 is illustrated in FIG. 1, techniques described herein may be utilized in association with captured images of various alternative objects, such as other object(s) that have a reflective or glossy surface and/or that include color(s) that may not be accurately reproduced in an image when a flash component is utilized in capturing the image.

The amount and position of glare present in a captured image of the photo 101 may be dependent upon the position of the client device 110 relative to the photo 101, the direction and/or brightness of light output from the window 103 and/or the lamp 104, and/or whether a flash component of the client device 110 was utilized in capturing the image (and the brightness of the flash if so). In some situations or implementations, the client device 110 can capture an image without any glare or with glare component(s) that are "not substantial" (e.g., fail to satisfy one or more thresholds). For example, the client device can capture an image of the photo 101 without glare when light output (if any) from the lamp 104 and/or the window 103 satisfy certain conditions and/or when the client device 110 is at certain poses relative to the photo 101.

However, there are many situations where glare is present in a captured image of the photo 101. When glare is present in a captured image of the photo 101, a glare removal process (or algorithm) can be performed by components of the image scanning engine 120 to generate an image of the photo 101 that mitigates (e.g., includes less, or does not include any) glare. The glare removal process may include directing, through user interface output, movement of the client device 110 to different positions relative to the photo 101 in order to capture images of the photo 101 from the different positions. By moving the client device 110 to capture images of the photo 101 from different positions, the different images that are captured are each affected slightly differently by glare, such as glare from the lamp 104 and/or window 103. Thus, each of the different captured images may include a different portion that is not affected by glare, and the unaffected portions of the captured images can be stitched together or otherwise combined to generate a composite image of the photo 101 that does not include any glare.

However, the process of moving the client device 110 to different positions, capturing multiple images, analyzing each of the captured images, and generating a composite image may be time-consuming, may utilize processing and/or power resources, and may require protracted user interaction. Although the incurred latency, processing/power utilization, and protracted user interaction may be acceptable when appropriate, such as for removing glare in multiple directions, they may be unacceptable when they could have been avoided or mitigated, such as when the glare is not present and/or is only in one direction. Accordingly, in various implementations an amount and/or location of glare in a captured image is detected and is used to determine whether the glare removal process should be performed or should be bypassed. If the amount of glare detected in the captured image is, e.g., less than a threshold amount of glare, implementations may bypass the glare removal process altogether. Where the glare removal process is performed, implementations disclosed herein utilize determined attribute(s) of glare in captured image(s) (e.g., amount(s) and/or location(s) of the glare) to determine whether a less resource/latency/user interaction intensive version of the glare removal process can be performed, e.g., in lieu of performing the entire glare removal process. For example, if the detected glare is only in one direction, such as horizontal, vertical, or diagonal, then an abbreviated version of the glare removal process may be performed to remove or otherwise mitigate the glare. Example abbreviated versions of the glare removal process are discussed further below with respect to FIGS. 3A1-3F.

As mentioned above, in various implementations one or more images can be captured using a flash component of the client device 110. Such images are referred to herein as "flash images". A flash image can be based on a single image captured by the camera, or can be a composite image that is based on multiple flash image(s) (e.g., a composite flash image generated to mitigate glare). The flash component of the client device 110 can be an inbuilt or standalone component that discharges light, and that is synchronized with a camera of the client device 110 to produce a flash to illuminate object(s) being captured by the camera. The camera can be, for example, a regular 2D camera, a stereo camera, a multi-spectral camera, and/or other camera that captures images. As also mentioned above, in various implementations one or more images can be captured without using a flash component of the client device 110. Such images are referred to herein as "ambient images". An ambient image can be based on a single image captured by the camera, or can be a composite image that is based on multiple ambient image(s) (e.g., a composite ambient image generated to mitigate glare).

A flash image of the photo 101 may have clarity, brightness, and display vivid colors in higher resolution, but the flash image may also include minor to moderate color changes relative to the photo 101. For example, there can be an effect caused by color cast in the flash image that impacts color(s) of the flash image relative to the photo 101, such as skin tone(s) of people in the photo 101. Such an effect can result from light outputted by the flash, and can be visibly manifested in the flash image as a yellowish tint on people with a dark skin tone and/or as a pale whitish tint on people with a light skin tone. In contrast, an ambient image of the photo 101 may have less vivid colors, but the colors may appear more authentic and similar to the photo 101. The color cast affecting the skin tone of the people can be minimal or absent in the ambient image. In view of these and other considerations, various implementations disclosed herein correct color of a flash image of an object utilizing a color space determined based on an ambient image of the object.

Turning now to the image scanning engine 120 of FIG. 1, it is illustrated with an image capture module 130, a glare detection module 122, a glare removal module 124, a color correction module 126, and a flash brightness module 128. The image capture module 130 includes an interface component 132, and an adaptation component 134. Although particular modules are illustrated in FIG. 1, it is understood that additional and/or alternative modules can be provided, and/or some modules may be omitted. Further, as described herein, it is understood that all or aspects of some modules can be implemented by one or more processors of the client device 110, while all or aspects of other modules can optionally be implemented by one or more remote computing devices that are in communication with the client device 110. In some implementations, the image scanning engine 120 is implemented by an application that executes at least in part on the client device 110, such as an image scanning application that can be installed and executed on the client device 110.

The image capture module 130 receives images captured by a camera of the client device 110, and sends the images to one or more other components of the image scanning engine 120. The image capture module 130 includes an interface component 132 that provides graphical and/or audible interfaces for guiding of the capturing of images. For example, the image capture module 130 can provide user interface output that guides a user of the client device 110 in the capture of one or more ambient and/or flash images according to implementations disclosed herein. Any provided graphical interface can be rendered via a display of the client device 110 and any provided audible interface can be rendered via speaker(s) of the client device 110.

The adaptation component 134 selectively causes the interface component 132 to be adapted in the performance of glare removal processes and/or color correction processes described herein. For example, the adaptation component 134 can cause, based on detection of glare in a captured image by glare detection module 122, a graphical interface rendered by the interface component to be adapted to provide one or more indicia to guide the capture of one or more further images that enable generation of a composite image that mitigates the glare. As described herein, the adaptation component 134 can determine a quantity of the indicia and/or locations of the indicia based on attribute(s) of the glare as determined by the glare detection module 122. As another example, the adaptation component 134 can cause the interface component 132 to adapt user interface output to guide a user in the capture of ambient image(s) for user in color correction, optionally in response to output from the color correction module 126.

The glare detection module 122 determines, based on one or more captured images, whether glare is present in captured image(s) and/or determines one or more attribute(s) of any glare in the captured image(s). In some implementations, the glare detection module 122 utilizes a glare model 152 in determining whether glare is present and/or in determining attribute(s) of any glare. The glare model 152 can be a trained machine learning model, such as trained neural network model that accepts at least one image as input, that includes one or more convolutional layers for processing of the image, and that can be utilized to generate, based on the processing, output that indicates whether glare is present and/or one or more attributes of any glare. In some of those implementations the glare detection module 122 can process at least on captured image utilizing the glare model 152 to generate output that indicates at least location(s) of any glare in the image. For example, the output can correspond to pixels (or groups of pixels) and can include corresponding probabilities for the pixels (or groups of pixels) that each indicate a corresponding likelihood that the pixel (or group of pixels) includes glare. Accordingly, the output can be utilized to determine region(s) (if any) of a captured image that are likely to include glare and/or to determine region(s) (if any) that are unlikely to include glare. Additional description of training and/or utilizing an example of the glare model 152 is provided below with respect to FIG. 4.

In some implementations, the glare detection module 122 additionally and/or alternatively detects whether glare is present in captured image(s) and/or attribute(s) of glare, through analysis of pixels of the image and without reference to output generated using a trained machine learning model. For example, the glare detection module 122 can examine hue and/or brightness of pixel(s) of captured image(s) relative to other pixel(s) of the captured image(s) in determining whether glare is present, where the glare is present, and/or magnitudes of the glare. In some implementations, the glare detection module determines whether glare is present in captured image(s) and/or attribute(s) of glare, based on multiple images captured in succession, and optionally based on additional sensor data associated with each of the multiple images. The additional sensor data associated with an image can include, for example, sensor data from an accelerometer, a gyroscope, an inertial measurement unit (IMU), and/or other sensor that provides an indication of the pose of the camera when the image was captured. The multiple images captured in succession can be from slightly different poses as a result of movement (e.g., shaky hand) of a user holding the client device 110, and the multiple images analyzed (optionally in combination with the corresponding sensor data) to determine if candidate glare components move in a photo (or other object) captured by the captured images—or stays stationary. This can enable distinguishing between glare that is included in the photo (or other object) itself (and not caused by a flash component and/or ambient light sources), and glare that is the result of a flash component and/or ambient light sources. Any glare included in a photo will not have the same movement with the subtle tilting and horizontal movement of the client device 110 as glare caused by a flash and/or ambient light sources. The glare detection module 122 can thus prevent indicating of glare included in a photo as glare that needs to be mitigated, while indicating glare caused by a flash and/or ambient light sources as glare that needs to be mitigated. This can enable, for example, the glare removal process to be bypassed for captured image(s) that are determined to include only glare included in a photo—or for glare included in a photo to be ignored in determining how to adapt a graphical interface for guiding the capture of further images for use in mitigating glare.

As described herein, in some implementations, in response to the glare detection module 122 determining glare is present, the adaptation component 134 can cause the interface component 132 to adapt an interface to guide the capture of further image(s) that can be utilized to mitigate the glare. The glare removal module 124 utilizes the further image(s) to mitigate the glare. For example, the glare removal module 124 can mitigate the glare by generating a composite image that is based on both image(s) utilized by glare detection module 122 and further image(s) captured following such image(s). For instance, the composite image can be generated based on at least a first portion of one of the image(s), and based on at least a second portion of one of the further image(s). For instance, the second portion of the one further image can correspond to a portion of the object that is obfuscated by glare in the one image. Also, for instance, the first portion of the one image can correspond to a portion of the object that is obfuscated by glare in the one further image.

The color correction module 126 can align one or more flash images of the photo 101 with one or more ambient images of the photo 101. As noted above, whereas a flash image is even in color with more detail and no shadow, the ambient image is more authentic in terms of color when compared to the photo 101. The color correction module 126 can determine and compare feature homographies of the flash and ambient images, combine the flash and ambient images, and generate a color corrected image. The color corrected image may include colors that match or otherwise accurately represent the original colors found in the photo 101. For example, the color corrected image can preserve the sharpness and resolution from a flash image and borrows the authentic colors from an ambient image.

In some implementations, the color correction module 126 can analyze a plurality of the flash and ambient images to select one of the images as a starting point for color correction. For example, the color correction module 126 can select a flash image as a starting point. The color correction module 126 can determine the image quality of the flash image. For example, the factors that dictate image quality include one or more of sharpness, dynamic range, exposure, image resolution, exposure, contrast, etc., and one or more can be analyzed by the module 126 to determine the image quality. In some implementations, the color correction module 126 may also detect image highlights in one or more regions of the flash image. For example, the image highlights may include one or more of blown-out highlights due to over-exposure and specular highlights due to glare from the flash. There may be loss of detail in the flash image caused by the image highlights. The color correction module 126 can generate a color corrected image where the image data from the no-flash image is borrowed to compensate for the image highlights in the one or more regions of the flash image. The color correction module 126 can also export or map the color data or color space from the no-flash image because it is more authentic while preserving the saturation of the flash image in the color corrected image.

In some implementations, the color correction module 126 can use a three-dimensional lookup table (3D LUT) approach to globally map the color space from the ambient image to the flash image to generate a color corrected image. The 3D LUT approach for color correction is statistical, and borrows the color space from the ambient image and preserves the saturation and exposure from the flash image in the color corrected image. The color correction module 126 accesses the 3D LUT and converts the region of the flash image to the color space of the ambient image as a whole, and not pixel by pixel. If the conversion were to be performed pixel by pixel, there may an issue of an inconsistent coloring in the no-flash image affecting the flash image in the colorizing and resulting in a color shadow.

In some implementations, the color correction module 126 can, with appropriate authorization, detect one or more faces in the flash image. The detection of the faces can optionally be detection of faces generally, and not detection of particular individuals associated with the faces. As noted above, there can be an effect caused by color cast in the flash image that shows up as a yellowish tint on the faces with a dark skin tone and as a pale whitish tint on the faces with a light skin tone. The global mapping of the color space using the 3D LUT approach may not have much of an impact on skin tone of the people in the color corrected image. In some implementations, the color correction module 126 refines the regions in 3D LUT corresponding to the one or more faces and relevant to the color of the skin tone. The color correction module 126 uses the updated 3D LUT to remove the color cast in the corrected image. In some implementations, the color correction module 126 determines a discrepancy relating to the skin tone of the one or more faces identified in the flash image and the no-flash image. For example, the color correction module 126 determines discrepancies in terms of a temperature shift and/or a hue effect. The color correction module 126 may also be configured to apply an auto white balance to the flash image based on the discrepancy to remove the color cast impacting the skin tone in the color corrected image.

In some implementations, the color correction module 126 detects the dynamic ranges of the flash image and the ambient image and combines the dynamic ranges in the color corrected image. For example, the dynamic ranges of the flash image and the ambient image can be different. The color correction module 126 treats the flash image and the ambient image as having different exposures and combines them accordingly. In one instance, the color correction module 126 detects highlights in an image with high exposure and borrows the image data from the other image with a lower exposure setting to generate the color corrected image. In another instance, the color correction module 126 detects shadows in an image with low exposure and borrows the image data from the other image with a higher exposure setting to generate the color corrected image. The color correction module 126 may also be configured to eliminate ghosting that may result from the alignment of the images using a four point pinning method, for example. It should be understood that the description of aligning one flash image with one ambient image is provided as an example, an alignment of any number of flash images and ambient images is contemplated and possible. The color correction performed using a flash and an ambient image is particularly advantageous because capturing the no-flash image and its associated processing has a relatively smaller drain on the battery resource of the client device 110.

The flash brightness module 128 can determine one or more brightness levels for a flash component of the client device 110, for capturing corresponding flash image(s). For example, the flash brightness module 128 receives, from the image capture module 130, capture metadata (e.g., lens aperture, focal length, camera shutter speed, exposure setting, ISO sensitivity, timestamp, GPS location, etc.) relating to ambient image(s) at ambient lighting conditions. The flash brightness module 128 analyzes the capture metadata and determines a quality of light reflected by the photograph material being scanned for image capture. The photograph material, e.g., a laminated photograph, may scatter light differently depending on the reflectiveness or glossiness of the surface and the surface lighting hitting the surface of the photograph material. This may require a different brightness level of the flash to compensate for the reflectiveness and capture the flash image of the laminated photograph. In response to the determined quality of light reflected by the photograph material, the flash brightness module 128 determines a brightness level for the flash and sends instructions including the brightness level to the image capture module 130 to capture the flash image of the photograph with a flash set to that brightness level. For example, the flash brightness module 128 may determine a brightness level of the flash to offset the specular artifacts (e.g., glare) that may be caused by the photograph material under the ambient lighting conditions.

Figure 2:
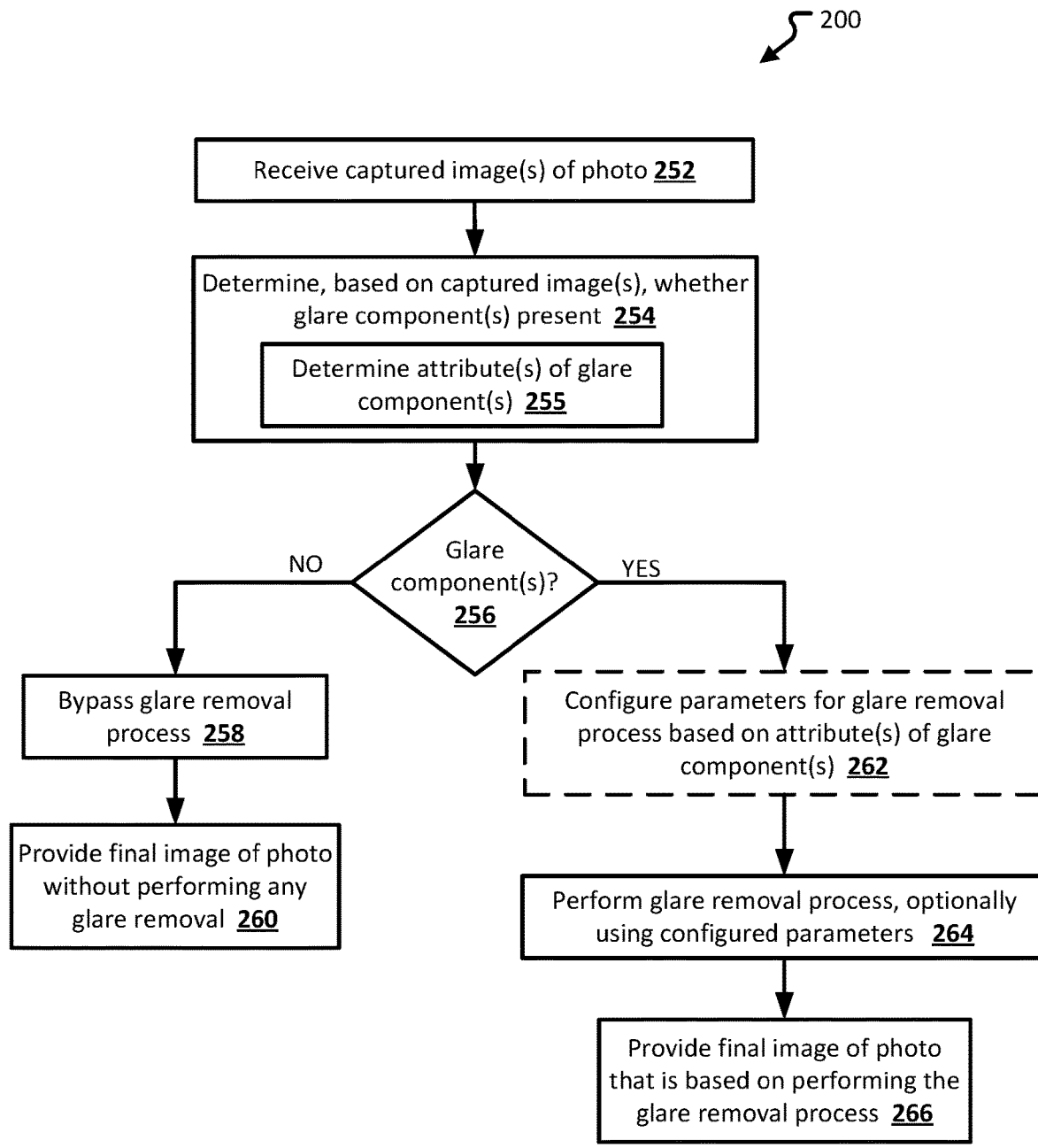
FIG. 2 illustrates an example adaptive glare removal process in accordance with one or more implementations.

FIG. 2 illustrates an example adaptive glare removal process 200 in accordance with one or more implementations. For explanatory purposes, the example process 200 is primarily described herein with reference to client device 110 of FIG. 1. However, the example process 200 is not limited to being performed by the client device 110 of FIG. 1, and can additionally and/or alternatively be performed by other computing device(s). Further for explanatory purposes, the blocks of the example process 200 are described herein as occurring in serial, or linearly. However, multiple blocks of the example process 200 may occur in parallel. In addition, the blocks of the example process 200 may be performed in a different order than the order shown and/or one or more of the blocks of the example process 200 may not be performed.

At step 252, the client device 110 receives captured image(s) of a photo, such as captured image(s) of photo 101 of FIG. 1. For example, the client device 110 may include and/or may be communicatively coupled to a camera or other image capture device that may be used to capture the image(s). At step 254, the client device 110 determines whether the captured image(s) include one or more glare components. Step 254 may include sub-step 255, where the client device 110 determines one or more attributes of any determined glare component(s). In some implementations, step 254 and sub-step 255 may be performed simultaneously. For example, the captured image(s) of the photo can be processed utilizing a machine learning model to generate output that indicate both whether glare component(s) are present, and attribute(s) of the glare component(s). For example, the output can indicate pixels or groups of pixels of the applied image and, for each of the pixels or groups of pixels, indicate a probability that glare is present. Accordingly, the output can be utilized to determine whether glare component(s) are present (e.g., "yes" if one or more of the probabilities satisfy a threshold) and to determine attribute(s) of those glare component(s) (e.g., location(s) and/or sizes of the glare component(s)). In some implementations, step 254 and sub-step 255 may be performed non-simultaneously. In some of those implementations, sub-step 255 may be performed only in response to determining glare component(s) are present at step 254.

In some implementations, in determining at step 254 whether glare component(s) are present and/or in determining attribute(s) of the glare component(s) at sub-step 255, the client device 110 may leverage quadrilateral detection and feature tracking associated with the captured image. The client device 110 may examine the brightness and/or hue of one or more pixels that are most likely to include a glare, as well as the movement of the glare relative to the position of the quadrilateral and/or other features of the photo 101. For example, the client device 110 may continually capture images of the photo 101 and slight variations in the movement of the client device 110, such as due to jitter caused by the user holding the client device 110, may cause the glare to appear to move in each subsequently captured image relative to the position of the quadrilateral (which may define the boundaries or outline of the photo 101 for which the image is being captured).

In some implementations, in determining at step 254 whether glare component(s) are present, the client device 110 can distinguish between glare from light source(s) and glare that is inherent in the photo 101 itself. For example, the photo 101 may include an inherent glare that is part of the photo 101, e.g., glare that is not caused by light source(s) reflecting off the photo 101. The client device 110 can use sensor data from one or more sensor devices included in and/or communicatively coupled to the client device 110 to determine whether the captured image includes the inherent glare. For example, an accelerometer, a gyroscope, and/or other sensor devices may be used to predict the movement of detected glare from one or more light source(s). Any inherent glare in the captured image will not have the same movement with the subtle tilting and horizontal movement of the client device 110 as the glare caused by one or more light source(s).

At step 256, the client device 110 proceeds to step 258 if it is determined at step 254 that no glare component(s) are present—or proceeds to step 262 or step 264 if it is determined that glare component(s) are present.

At step 258, the client device 110 bypasses the glare removal process, and proceeds to step 260. At step 260, the client device 110 provides a final image of the photo 101 without performing any glare removal. The final image can be one of the captured image(s) of step 252, and/or a color corrected image according to implementations disclosed herein. One example of providing a final image without any glare removal is discussed further below with respect to FIG. 3F.

When it is determined that glare component(s) are present, the client device 110 proceeds to step 262 or step 264. At optional step 262, the client device 110, may configure parameters for the glare removal process based on the attribute(s) of the glare component(s) as determined at sub-step 255. For example, the attribute(s) can indicate the size, and/or position/location of glare in the captured image, and the client device 110 can configure one or more parameters of the glare removal process based on such attribute(s). The one or more parameters may control a number of additional images that will be captured in the glare removal process and/or the positioning of the client device 110 when capturing the additional images in the glare removal process. As one example, the parameters can control graphical and/or audible user interface output that is provided to direct a user in adjusting the client device 110 to capture one or more additional images. For example, a quantity of guiding indicia and/or location(s) of the guiding indicia can be determined based on attribute(s) of the glare component(s). Some example variations in the configuration of the parameters for the glare removal process are discussed further below with respect to FIGS. 3A1-3F.

At step 264, the client device 110 then performs the glare removal process optionally using the configured parameters that may be determined at step 262. For example, the client device 110 can provide user interface output that directs a user to adjust the client device 110 to additional poses, capture further images at one or more of the additional poses, and generate a composite image based on one or more of the image(s) of step 252 and based on one or more of the further image(s).

At step 266, after performing the glare removal process, the client device 110 provides a final image of the photo 101, where the final image is based on the performing of the glare removal process. For example, the final image can be a composite image based on one or more of the image(s) of step 252, and based on one or more further image(s)

captured during the glare removal process. Also, for example, the final image can be based on such a composite image, and based on color correction as described herein. For instance, the final image can be a color corrected version of the composite image, where it is color corrected based on an ambient image of the photo 101.

As appreciated from the above description, implementations of the example adaptive glare removal process 200 allow the client device 110 to bypass the glare removal process entirely when the glare removal process is not necessary and also allows the client device 110 to perform targeted and abbreviated version(s) of the glare removal process, such as when the detected glare is only in one direction and/or minimal glare is otherwise detected, thereby conserving processing/power resources and reducing latency as well as user interaction requirements.

Turning now to FIGS. 3A1-3F, examples are provided of selectively adapting a graphical interface rendered on a display of the client device 110, based on whether captured image(s) include glare component(s) and/or based on attribute(s) of the glare component(s).

FIG. 3A1 illustrates the client device 110 displaying an example graphical interface 312A that can be presented in response to capture of an image 311A (FIG. 3A2) of the photo 101 that has multiple glare components 314A1, 314A2, and 314A3 as illustrated in FIG. 3A2. As illustrated in FIG. 3A2, the multiple glare components 314A1, 314A2, and 314A3 are on the portion of the captured image 311A that captures the photo, and are in multiple directions.

The graphical interface 312A of FIG. 3A1 includes an electronic viewfinder that provides a real-time feed of sensor data captured by a camera of the client device 110. Superimposed over the feed in the graphical interface 312A is a reference indicia 318A and four target indicia 316A1, 316A2, 316A3, and 316A4. The reference indicia 318A can be rendered in a fixed location within the graphical interface 312A (e.g., at the center as illustrated), whereas the target indicia 316A1-316A4 can be rendered non-fixed within the graphical interface 312A (but fixed relative to rendering of the photo 101 in the real-time feed). In this manner, a user can adjust the pose of the client device to cause the reference indicia 318A to sequentially move, in the graphical interface 312A, to each of the target indicia 316A1-316A4. For example, when the user moves the client device 110 up and to the left (when looking at FIG. 3A1), the reference indicia 318A will stay fixed in the center of the graphical interface 312A, but will move closer to the target indicia 316A1 in the graphical interface 312A—as the target indicia 316A1-316A4 move in the graphical interface 312A, but stay substantially fixed relative to the rendering of the real-time feed from the camera. As another example, when the user moves the client device 110 down and to the right (when looking at FIG. 3A1), the reference indicia 318A will move closer to the target indicia 316A4 in the graphical interface 312A. Additional image(s) will be captured (e.g., automatically) when the reference indicia 318A is at or near each of the target indicia 316A1-316A4, thereby enabling the capture of the additional image(s) at each of the additional poses corresponding to the target indicia 316A1-316A4. As described herein, the additional images from the additional poses can be utilized to generate a composite image that mitigates glare. Accordingly, movement of the client device 110 can cause each of the multiple glares 314A1-314A3, e.g., caused by one or more light sources, to be moved to different portions corresponding captured image(s) at each position, thereby leaving a different portion at each position without any glare. The different portions of each of the captured images that do not include any glare can then be stitched together to generate a composite image of the photo 101 that does not include any glare.

FIG. 3B1 illustrates the client device 110 displaying an example graphical interface 312B that can be presented in response to capture of an image 311B (FIG. 3B2) of the photo 101. The image 311B has multiple glare components 314B1, 314B2, each in a horizontal direction as illustrated in FIG. 3B2.

The graphical interface 312B of FIG. 3B1 includes an electronic viewfinder that provides a real-time feed of sensor data captured by a camera of the client device 110. Superimposed over the feed in the graphical interface 312A is a reference indicia 318B and two target indicia 316B1 and 316B2. The reference indicia 318B can be rendered in a fixed location within the graphical interface 312B (e.g., at the center as illustrated), whereas the target indicia 316B1 and 316B2 can be rendered non-fixed within the graphical interface 312B (but fixed relative to rendering of the photo 101 in the real-time feed). In this manner, a user can adjust the pose of the client device 110 to cause the reference indicia 318B to sequentially move, in the graphical interface 312C, to each of the two target indicia 316B1 and 316B2. Additional image(s) will be captured (e.g., automatically) when the reference indicia 318B is at or near each of the target indicia 316B1 and 316B2, thereby enabling the capture of the additional image(s) at each of the additional poses corresponding to the target indicia 316B1 and 316B2. As described herein, the additional images from the additional poses can be utilized to generate a composite image that mitigates glare.

The two target indicia 316B1 and 316B2 are vertically offset. Two target indicia can be included and/or can be vertically offset based on attributes of the glare components 314B1 and 314B2 of the image 311B of the photo 101. For example, they can be vertically offset based on the size and/or position of the glare components 314B1 and 314B2, to enable the capture of additional image(s) that are likely to move glare components in further additional images to portions that don't have any glare in image 311B. It is noted that the quantity of target indicia in FIG. 3B1 is less than the quantity in FIG. 3A1, thereby leading to an abbreviated glare removal process, such as less further images being captured and/or less screen-on time being utilized in the user moving the client device 110 to additional poses.

FIG. 3C1 illustrates the client device 110 displaying an example graphical interface 312C that can be presented in response to capture of an image 311C (FIG. 3C2) of the photo 101. The image 311C has a single glare component 314C1 in a vertical direction as illustrated in FIG. 3C2.

The graphical interface 312C of FIG. 3C1 includes an electronic viewfinder that provides a real-time feed of sensor data captured by a camera of the client device 110. Superimposed over the feed in the graphical interface 312C is a reference indicia 318C and two target indicia 316C1 and 316C2. The reference indicia 318C can be rendered in a fixed location within the graphical interface 312C (e.g., at the center as illustrated), whereas the target indicia 316C1 and 316C2 can be rendered non-fixed within the graphical interface 312B (but fixed relative to rendering of the photo 101 in the real-time feed). In this manner, a user can adjust the pose of the client device 110 to cause the reference indicia 318C to sequentially move, in the graphical interface 312C, to each of the two target indicia 316C1 and 316C2. Additional image(s) will be captured (e.g., automatically) when the reference indicia 318C is at or near each of the target indicia 316C1 and 316C2, thereby enabling the capture of the additional image(s) at each of the additional poses corresponding to the target indicia 316C1 and 316C2. As described herein, the additional images from the additional poses can be utilized to generate a composite image that mitigates glare.

The two target indicia 316C1 and 316C2 are horizontally offset. Two target indicia can be included and/or can be horizontally offset based on attribute(s) of the glare component 314C1 of the image 311C of the photo 101. For example, they can be horizontally offset based on the size and/or position of the glare component 314C1 to enable the capture of additional image(s) that are likely to move glare components in further additional images to portions that don't have any glare in image 311C. It is noted that the quantity of target indicia in FIG. 3C1 is less than the quantity in FIG. 3A1, thereby leading to an abbreviated glare removal process, such as less further images being captured and/or less screen-on time being utilized in the user moving the client device 110 to additional poses.

FIG. 3D1 illustrates the client device 110 displaying an example graphical interface 312D that can be presented in response to capture of an image 311D (FIG. 3D2) of the photo 101. The image 311D has a single glare component 314D1 in a diagonal direction as illustrated in FIG. 3D2.

The graphical interface 312D of FIG. 3D1 includes an electronic viewfinder that provides a real-time feed of sensor data captured by a camera of the client device 110. Superimposed over the feed in the graphical interface 312D is a reference indicia 318D and two target indicia 316D1 and 316D2. The reference indicia 318D can be rendered in a fixed location within the graphical interface 312D (e.g., at the center as illustrated), whereas the target indicia 316D1 and 316D2 can be rendered non-fixed within the graphical interface 312B (but fixed relative to rendering of the photo 101 in the real-time feed). In this manner, a user can adjust the pose of the client device 110 to cause the reference indicia 318D to sequentially move, in the graphical interface 312D, to each of the two target indicia 316D1 and 316D2. Additional image(s) will be captured (e.g., automatically) when the reference indicia 318D is at or near each of the target indicia 316D1 and 316D2, thereby enabling the capture of the additional image(s) at each of the additional poses corresponding to the target indicia 316D1 and 316D2. As described herein, the additional images from the additional poses can be utilized to generate a composite image that mitigates glare.

The two target indicia 316D1 and 316D2 are horizontally offset. Two target indicia can be included and/or can be horizontally offset based on attribute(s) of the glare component 314D1 of the image 311D of the photo 101. For example, they can be horizontally offset based on the size and/or position of the glare component 314D1 to enable the capture of additional image(s) that are likely to move glare components in further additional images to portions that don't have any glare in image 311D. It is noted that the quantity of target indicia in FIG. 3D1 is less than the quantity in FIG. 3A1, thereby leading to an abbreviated glare removal process, such as less further images being captured and/or less screen-on time being utilized in the user moving the client device 110 to additional poses.

Figure 3E:
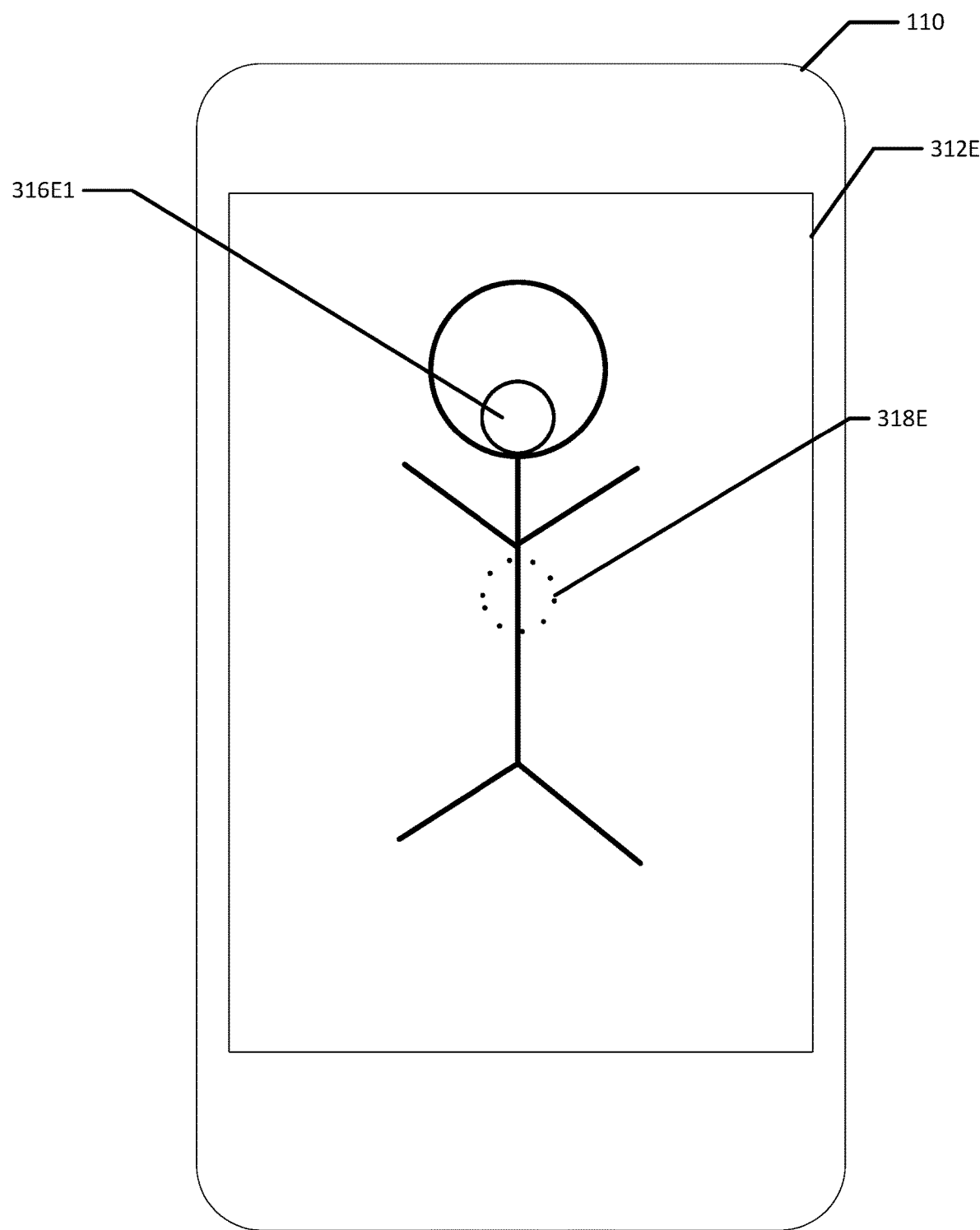
FIGS. 3E and 3F each illustrate an example client device displaying an example graphical interface that can be presented in response to capture of an image having no substantial glare components.

FIG. 3E illustrates the client device 110 displaying an example graphical interface 312E that can be presented in response to capture of an image (unillustrated) of the photo 101 that does not include substantial glare and was captured with a flash on in accordance with one or more implementations. In FIG. 3E, the graphical interface 312E includes an electronic viewfinder that provides a real-time feed of sensor data captured by a camera of the client device 110, and superimposed over the feed in the graphical interface 312E is a reference indicia 318E and one target indicia 316E. The reference indicia 318E can be rendered in a fixed location within the graphical interface 312E (e.g., at the center as illustrated), whereas the target indicia 316E can be rendered non-fixed within the graphical interface 312E (but fixed relative to rendering of the photo 101 in the real-time feed). In this manner, a user can adjust the pose of the client device 110 to cause the reference indicia 318E to move, in the graphical interface 312E, to the single target indicia 316E. Additional image(s) will be captured (e.g., automatically) when the reference indicia 318E is at or near the target indicia 316E, thereby enabling the capture of the additional image(s) at additional pose(s) corresponding to the target indicia 316E. As described herein, the additional image(s) from the additional pose(s) can be utilized to generate a composite image that mitigates glare.

The single target indicia 316E can be provided based on determining there is no substantial glare, and/or based on determining that the prior image was captured with a flash on. It is noted that the quantity of target indicia in FIG. 3E is less than the quantity in FIG. 3A1, and less than the quantity in FIGS. 3B1 and 3C1, thereby leading to an abbreviated glare removal process.

Figure 3F:
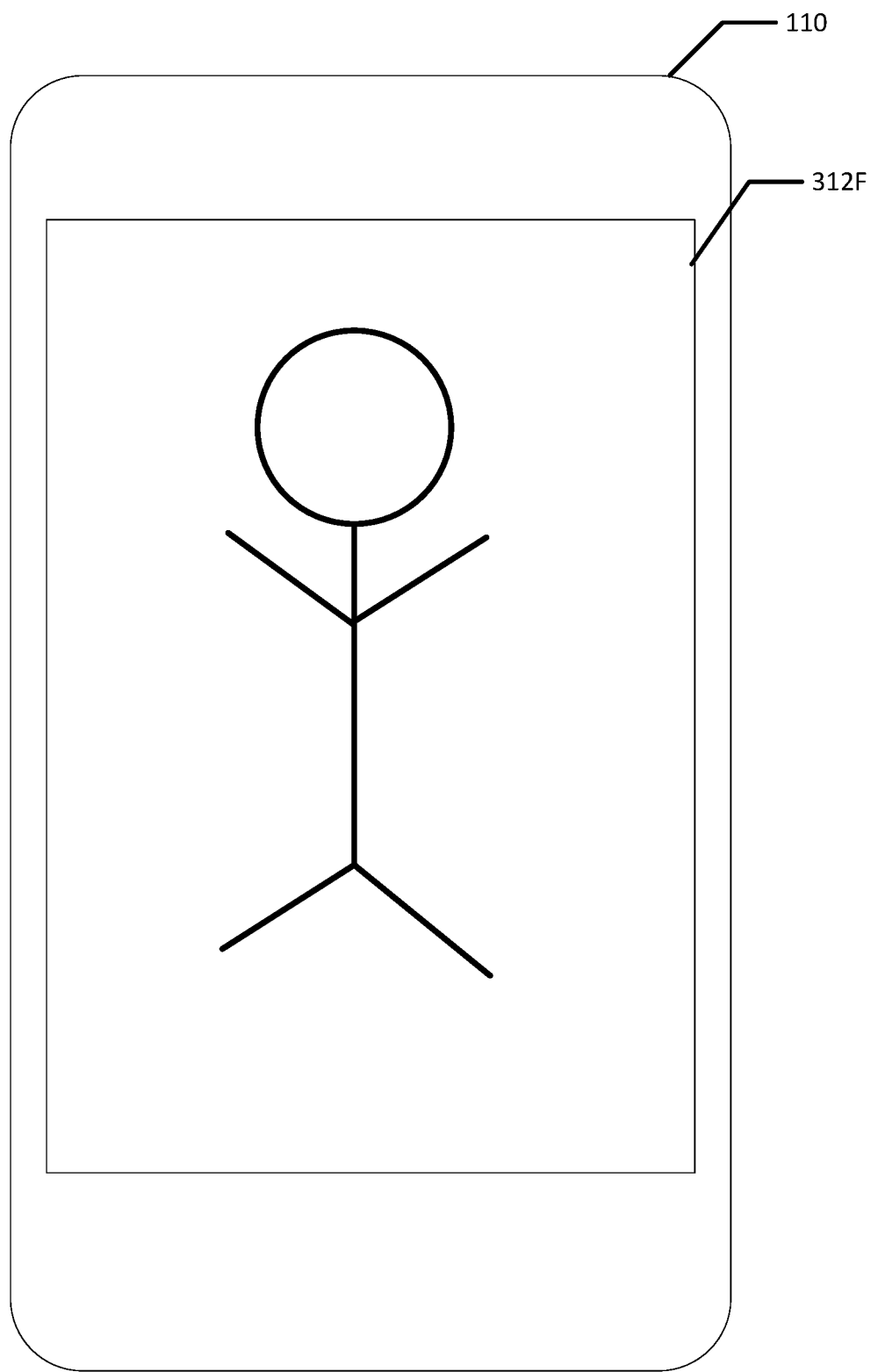

FIG. 3F illustrates the client device 110 displaying an example graphical interface 312F that can be presented in response to capture of an image (unillustrated) of the photo 101 that does not include substantial glare and was captured without a flash on in accordance with one or more implementations. In FIG. 3F, no indicia are illustrated that are associated with the glare removal process, and the glare removal process can be bypassed. In some implementations, an interface similar to FIG. 3F may also be displayed when no substantial glare is detected, even if a flash was utilized in capture of an initial image.

Figure 4:
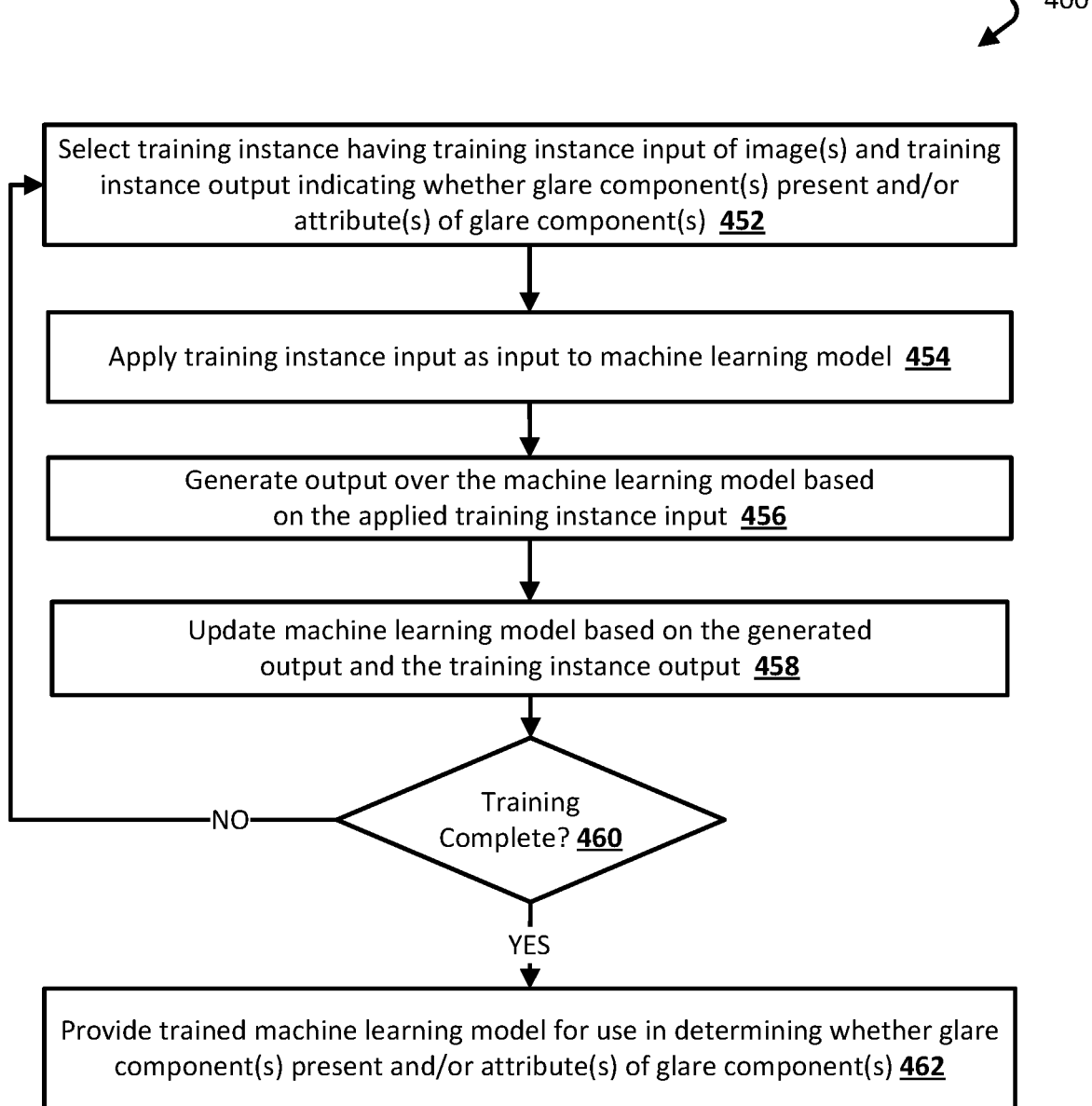
FIG. 4 is a flowchart illustrating an example method for training a machine learning model for use in determining whether glare component(s) are present in an image, and/or or determining attribute(s) of glare component(s) in an image, in accordance with one or more implementations.

FIG. 4 is a flowchart illustrating an example method for training a machine learning model for use in determining whether glare component(s) are present in an image, and/or or determining attribute(s) of glare component(s) in an image, in accordance with one or more implementations. The steps of the flowchart can be performed by one or more processors, such as a TPU, GPU, and/or CPU. For convenience, the steps are described with respect to performance by a system that can include one or more of the processors and/or other components.

At step 452, the system selects a training instance having training instance input of one or more images, and training instance output that indicates: whether glare component(s) are present and/or attribute(s) of glare component(s). In some implementations, the training instance output includes a value for each of the pixels of the image(s), with each value indicating whether glare is present in a corresponding pixel and/or an extent of the glare. For example, the training instance input can be an image that is 512 by 512 pixels, with 3 channels, and the training instance output can be 512 by 512 values, with each value indicating whether glare is present in a corresponding pixel and/or an extent of the glare. For instance, pixels with glare can have a value of "1", whereas pixels without glare can have a value of "0". Also, for instance, pixels with the "most" glare can have a value of "1", pixels with "medium" glare can have a value of "0.7", pixels with "low" glare can have a value of "0.5", and pixels without glare can have a value of "0.0". In some other implementations, the training instance output includes a value for each of a plurality of pixel group(s) of the image(s), with each value indicating whether glare is present in a corresponding pixel group and/or an extent of the glare. For example, the training instance input can be an image that is 512 by 512 pixels, with 3 channels, and the training instance output can be 32 by 32 values, with each value corresponding to an 8 by 8 group of pixels. In some other implementations, the training instance output includes a single value indicating whether glare is present in any part of the training instance input. Additional and/or alternative training instances can be utilized, depending on the configuration of the machine learning model. In some implementations, the training instances are generated based on manual labeling, and/or are generated utilizing non machine learning techniques that may be more computationally intensive relative to use of the machine learning model, once trained.

At step 454, the system applies the training instance input as input to a machine learning model. The machine learning model can have input and output dimensions that match those of the training instances. In various implementations, the machine learning model is a neural network model, such as a neural network model with one or more convolutional layers and additional layers (e.g., affine layer(s)). In some of those implementations, the number of layers and/or nodes can be limited to enable efficient usage of the trained machine learning model by various client devices (e.g., to not overburden hardware resource(s) of the client devices).

At step 456, the system generates output over the machine learning model based on the applied training instance input. For example, the system can generate the output based on processing of the training instance input using the current trained weights of the machine learning model.

At step 458, the system updates the machine learning model based on the generated output, and based on the training instance output. For example, the system can determine an error based on the difference between the generated output and the training instance output, and back propagate the error over the machine learning model. Although a non-batch learning technique is described in method 400, batch learning can additionally and/or alternatively be utilized.

At step 460, the system determines whether training is complete. If not, the system proceeds back to step 452, selects another training instance, and performs another iteration of steps 454, 456, and 458 utilizing the additional training instance. If so, the system proceeds to step 462. The system can determine training is complete based on there being no additional unprocessed training instances, based on completion of a certain quantity of epochs, and/or based on additional and/or alternative criteria.

At step 462, the system provides the trained machine learning model for use in determining whether glare component(s) are present in images and/or in determining attribute(s) of glare component(s). For example, the system can provide the trained machine learning model to client devices for local use of the trained machine learning model by the client devices in performance of various methods described herein.

Figure 5:
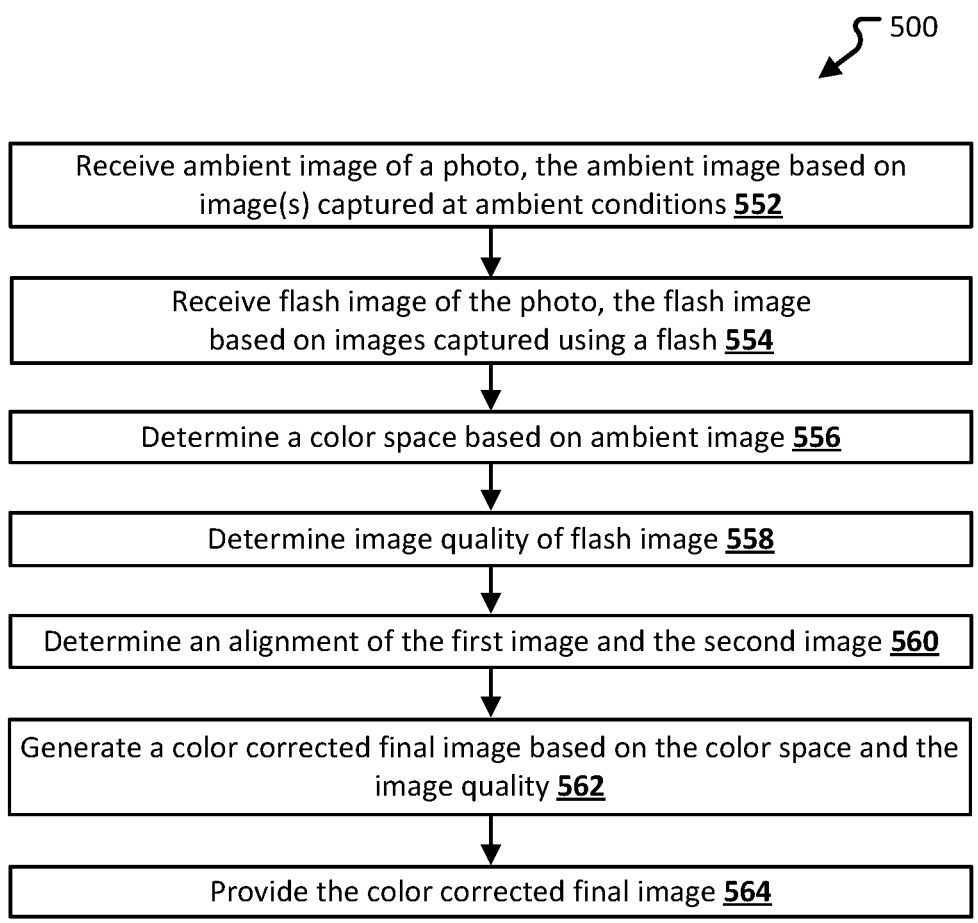
FIG. 5 is a flowchart illustrating an example method for correcting color of a flash image.

FIG. 5 is a flowchart illustrating an example method 500 for correcting color of the image scanned using a flash in accordance with the present disclosure. The steps of the flowchart can be performed by, for example, the client device 110. For convenience, the steps are described with respect to performance by a system that can include one or more processors of the client device 110 and/or other components.

At step 552, the system receives an ambient image of a photo, where the ambient image is based on one or more images captured at ambient conditions in an environment. For example, the ambient image can be a single image, or multiple stitched together images, where the image(s) are each captured without the use of a flash component.

At step 554, the system receives a flash image of the photo, where the flash image is based on image(s) captured using a flash in an environment. For example, the flash image can be a single image, or multiple stitched together images, where the image(s) are each captured with the use of a flash component.

At step 556, the system determines a color space based on the ambient image. As noted above, the colors may appear more authentic in the ambient image and similar to the photo.

At step 558, the system determines an image quality of the flash image. For example, the color correction module 126 determines one or more factors that indicate image quality, e.g., exposure, image resolution, sharpness, contrast, dynamic range, etc.

At step 560, the system determines an alignment of the ambient image and the flash image. This is done, for example, to enable borrowing the color space from the ambient image and preserves the saturation and exposure from the flash image.

At step 562, the system generates a color corrected image based on the color space determined at step 556 and the image quality determined at step 558. For example, the color correction module 126 uses a 3D LUT approach to globally map the color space from the ambient image to the flash image.

At step 564, the system provides the color corrected final image. For example, the system can provide the color corrected final image to a client device of a user and/or store the color corrected final image (e.g., in non-dynamic storage).

Figure 6:
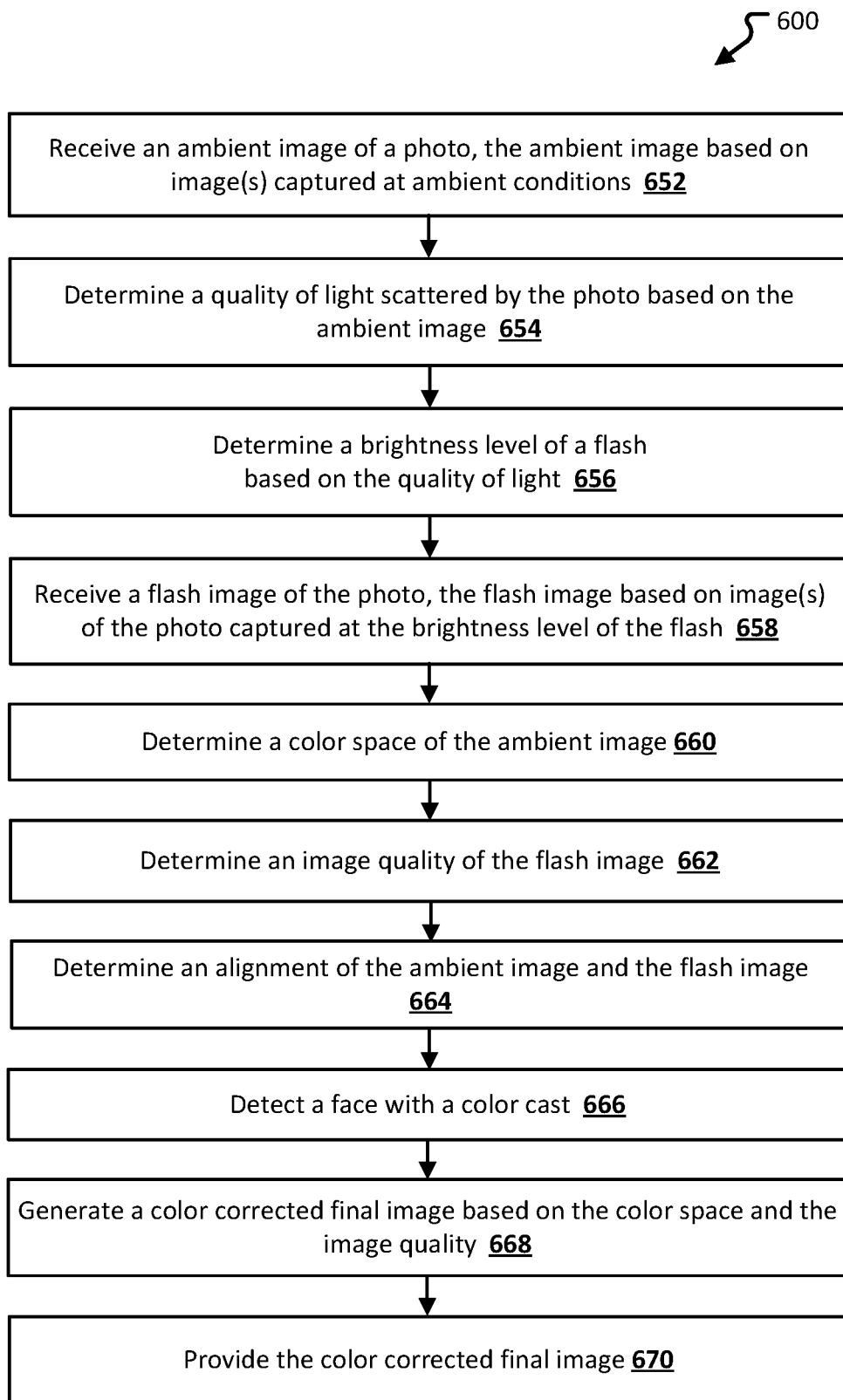
FIG. 6 is a flowchart illustrating another example method for correcting color of a flash image.

Referring now to FIG. 6, another example method 600 for correcting color of the image scanned using a flash is provided. The steps of the flowchart can be performed by, for example, the client device 110. For convenience, the steps are described with respect to performance by a system that can include one or more processors of the client device 110 and/or other components.

At step 652, the system receives an ambient image of a photo, where the ambient image is based on image(s) captured at ambient conditions. At step 654, the system determines a quality of light scattered by the photo based on the ambient image. At step 656, the system determines a brightness level of a flash component based on the quality of the light determined at step 654. At step 658, the system receives a flash image of the photo, where the flash image is based on image(s) of the photograph captured with a flash component using the brightness level of the flash component, as determined at step 656. At step 660, the system determines a color space of the ambient image. At step 662, the system determines an image quality of the flash image. At step 664, the system determines an alignment of the ambient image and the flash image. At step 666, the system detects a face with a color cast. At step 668, the system generates a color corrected final image based on the color space determined at step 660 and the image quality determined at step 662. At step 670, the system provides the color corrected final image. For example, the system can provide the color corrected final image to a client device of a user and/or store the color corrected final image (e.g., in non-dynamic storage).

Figure 7:
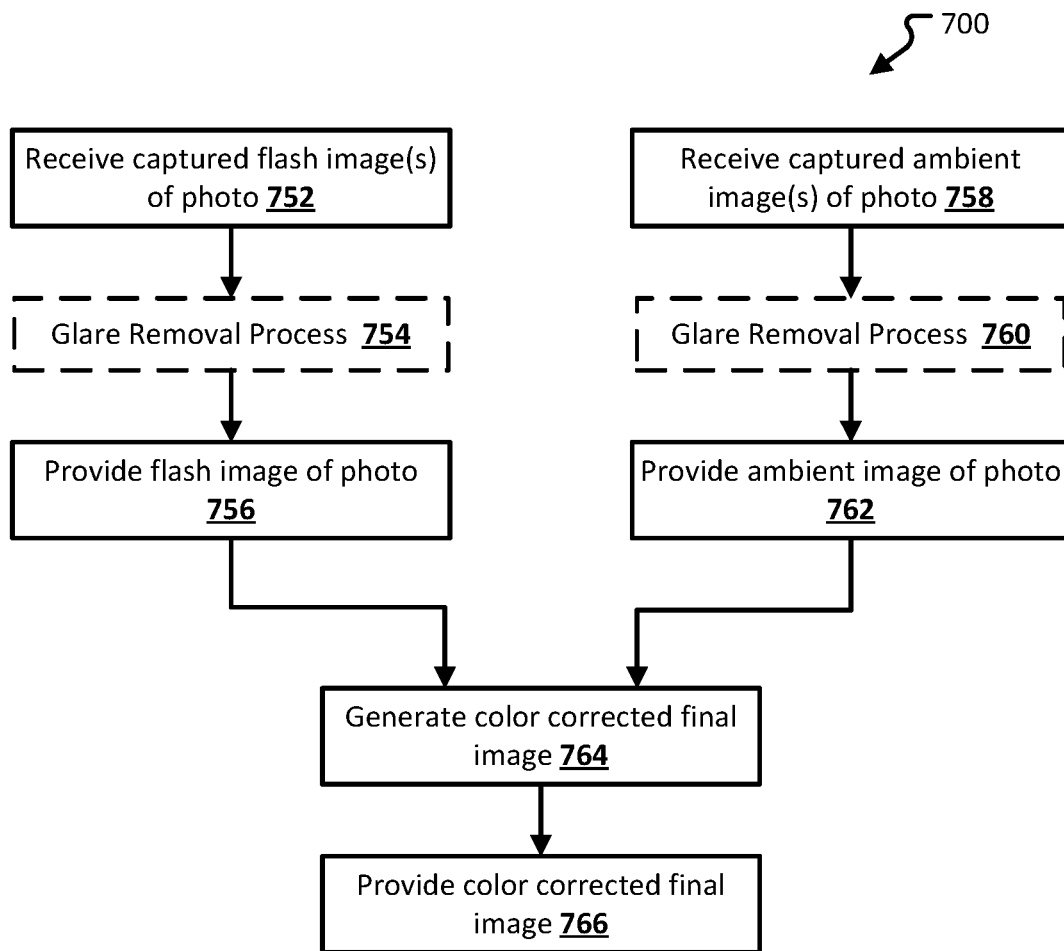
FIG. 7 is a flowchart illustrating an example method for generating and providing a color corrected image.

Referring now to FIG. 7, another example method 700 for generating and providing a color corrected image is provided. At step 752, the system receives captured flash image(s) of a photo. At step 754, the system optionally performs a glare removal process based on the received flash image(s), such as the glare removal process described in FIG. 2. Determining whether to perform the glare removal process, and/or determining parameters for the glare removal process, can be based on various techniques described herein. At step 756, the system provides a flash image of the photo. In some implementations, the flash image is based on a single captured flash image received at block 752. In some other implementations, the flash image provided at step 756 is based on stitching and/or otherwise combining multiple flash images. For example, the flash image can be based on stitching and/or otherwise combining multiple flash images using the glare removal process at step 754.

At step 758, the system receives captured ambient image(s) of a photograph. At step 760, the system optionally performs a glare removal process based on the received ambient image(s), such as the glare removal process described in FIG. 2. Determining whether to perform the glare removal process, and/or determining parameters for the glare removal process, can be based on various techniques described herein. At step 762, the system provides an ambient image of the photograph. In some implementations, the ambient image is based on a single captured ambient image received at step 758. In some other implementations, the ambient image provided at step 762 is based on stitching and/or otherwise combining multiple ambient images. For example, the ambient image can be based on stitching and/or otherwise combining multiple flash images using the glare removal process at step 760.

At step 764, the system generates a color corrected final image based on the provided flash image of the photograph and the provided ambient image of the photograph. At step 766, the system provides the color corrected final image. For example, the system can provide the color corrected final image to a client device of a user and/or store the color corrected final image (e.g., in non-dynamic storage).

In some implementations, all or aspects of various methods described herein can be performed locally by a client device. In some of those implementations, data related to any captured photos is maintained locally at the client device, optionally until a "final image" is generated (color corrected and/or glare removed), at which time the final image can optionally be stored in a secure cloud storage that is private to the user, if the user has consented to such storage.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 8:
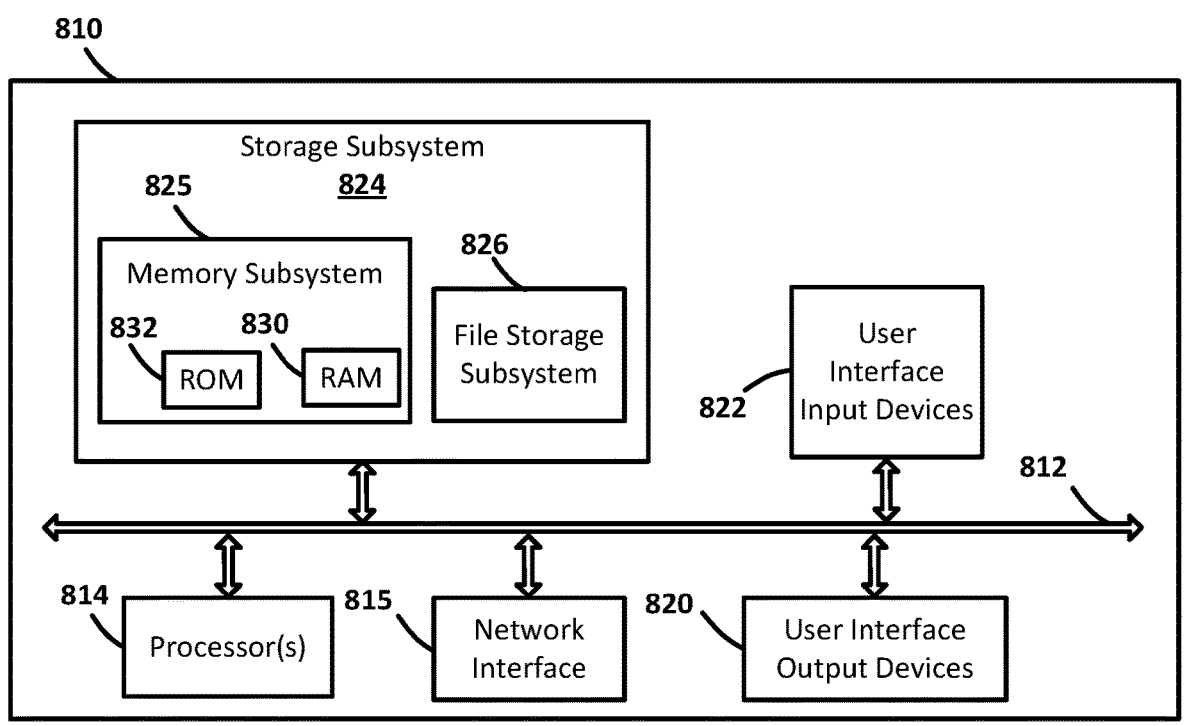
FIG. 8 is a block diagram of an example computer system that can be utilized in implementing all or aspects of one or more methods disclosed herein.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface input devices 822, user interface output devices 820, and a network interface subsystem 815. The input and output devices allow user interaction with computer system 810. Network interface subsystem 815 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform one or more of the methods described herein such as, for example, the methods of FIGS. 2, 4, 5, 6, and/or 7.

These software modules are generally executed by processor 814 alone or in combination with other processors. Memory subsystem 825 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by storage subsystem 824 in the file storage subsystem 826, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

What is claimed is:

1. A method implemented by one or more processors, comprising:
   determining that a prior flash image includes a glare component, the prior flash image captured by a camera of a client device with a flash component of the client device activated;
   receiving an ambient image of an object, the ambient image based on one or more first images each captured by the camera of the client device without the flash component of the client device activated;
   in response to determining that the prior flash image includes the glare component, rendering user interface output at the client device to direct user adjustment of a pose of the client device, wherein content of the user interface output is based on the glare component;
   capturing one or more second images with the camera of the client device with the flash component of the client device activated, wherein the rendering the user interface output to direct user adjustment of the pose of the client device is prior to the one or more second images being captured;
   obtaining a flash image of the object, the flash image based on the one or more second images captured by the camera of the client device with the flash component of the client device activated;
   determining a color characteristic of the ambient image;
   generating a color corrected image by modifying the flash image based on the color characteristic; and
   presenting, on a display screen of the client device, the color corrected image.

2. The method of claim 1, wherein the color characteristic is a color space of the ambient image.

3. The method of claim 1, wherein the object is a printed photo.

4. The method of claim 1, further comprising:
   determining an image quality of the flash image, wherein determining the image quality includes determining at least one factor of the flash image including: exposure, image resolution, sharpness, contrast, or dynamic range,
   wherein generating the color corrected image is further based on the image quality.

5. The method of claim 1, further comprising:
   determining an alignment of the flash image and the ambient image,
   wherein generating the color corrected image is further based on the alignment of the flash image and the ambient image.

6. The method of claim 1, further comprising:
   determining that a glare is caused by the object based on the ambient image; and
   determining, based on the glare, a brightness level for the flash component that offsets the glare, wherein the brightness level of the flash component is used during capture of at least one of the one or more second images captured by the camera of the client device with the flash component of the client device activated.

7. The method of claim 1, wherein generating the color corrected image comprises utilizing image data from the ambient image to compensate for image highlights in one or more regions of the flash image.

8. The method of claim 1, wherein generating the color corrected image includes globally mapping a color space from the ambient image to the flash image based on a three-dimensional lookup table.

9. The method of claim 1, wherein the one or more second images are a plurality of second images captured by the camera of the client device with the flash component of the client device activated, and further comprising:
   generating the flash image based only on the plurality of second images.

10. The method of claim 1, wherein:
    determining that the prior flash image includes the glare component includes processing the prior flash image to determine one or more attributes of the glare component, and
    rendering the user interface output includes adapting the user interface output based on the one or more attributes of the glare component, wherein the one or more attributes include one or more locations in the prior flash image for the glare component, and wherein the adapting comprises one or more of:
       determining a quantity of one or more indicia to display as the user interface output; or
       determining a location on a display screen of the client device to show each of the one or more indicia as the user interface output.

11. The method of claim 1, further comprising, subsequent to generating the flash image:
    receiving at least one additional image captured by the camera of the client device, the additional image capturing an additional object;
    processing the additional image to determine that the additional image lacks a glare component; and
    based on determining that the additional image lacks any glare component, bypassing rendering of additional user interface output at the client device and bypassing guidance of capture of further images of the additional object.

12. A device comprising:
    a camera having a flash component;
    a display screen;
    at least one processor coupled to the camera and to the display screen, the at least one processor configured to:
    receive an ambient image of an object, the ambient image based on one or more first images each captured by the camera without the flash component activated;
    determine, based on the ambient image, that a glare is caused by the object
    determine, based on the glare, a brightness level for the flash component that offsets the glare;
    capture one or more second images using the camera with the flash component activated, wherein the brightness level of the flash component is used during capture of at least one of the one or more second images;
    obtain a flash image of the object, the flash image based on the one or more second images;
    determine a color characteristic of the ambient image;
    generate a color corrected image by modifying the flash image based on the color characteristic; and
    display the color corrected image on the display screen.

13. The device of claim 12, wherein the at least one processor is further configured to:
    determine an image quality of the flash image, wherein determining the image quality includes determining at least one factor of the flash image including: exposure, image resolution, sharpness, contrast, or dynamic range, wherein the at least one processor is configured to generate the color corrected image further based on the image quality.

14. The device of claim 12, wherein the at least one processor is further configured to perform:
prior to generating the color corrected image:
detect a glare component in a prior flash image captured prior to the one or more second image; and
in response to detection that the prior flash image includes the glare component, render user interface output on the display screen to direct user adjustment of a pose of the device, wherein content of the user interface output is based on the glare component,
wherein the rendering the user interface output to direct user adjustment of the pose of the device is prior to the one or more second images being captured.

15. A non-transitory computer readable medium with instructions stored thereon that, when executed by a processor, cause the processor to perform operations comprising:
obtaining an ambient image of an object, the ambient image based on one or more first images each captured by a camera of a client device without a flash component of the client device activated;
determining, based on the ambient image, that a glare is caused by the object;
determining, based on the glare, a brightness level for the flash component that offsets the glare;
capturing one or more second images using the camera with the flash component activated, wherein the brightness level of the flash component is used during capture of at least one of the one or more second images;
obtaining a flash image of the object, the flash image based on the one or more second images;
determining a color characteristic of the ambient image;
generating a color corrected image by modifying the flash image based on the color characteristic; and
presenting, on a display screen of the client device, the color corrected image.

16. The non-transitory computer readable medium of claim 15, wherein the operation of determining the color characteristic includes:

determining that the flash image has a higher exposure setting than the ambient image; and
detecting highlights in the flash image,
wherein generating the color corrected image includes utilizing image data from the ambient image corresponding to the highlights and providing the image data in the flash image.

17. The non-transitory computer readable medium of claim 15, wherein the operation of determining the color characteristic includes:
determining that the flash image has a lower exposure setting than the first ambient image; and
detecting shadows in the flash image,
wherein generating the color corrected image includes utilizing image data from the ambient image corresponding to the shadows and providing the image data in the flash image.

18. The non-transitory computer readable medium of claim 15 wherein:
the one or more first images are a plurality of first images; and
obtaining the ambient image includes generating the ambient image based only on the plurality of first images captured by the camera of the client device without the flash component of the client device activated.

19. The non-transitory computer readable medium of claim 15, wherein the operations further comprise:
prior to generating the color corrected image:
detecting a glare component in a prior flash image captured prior to the one or more second images; and
in response to detecting that the prior flash image includes the glare component, rendering user interface output at the client device to direct user adjustment of a pose of the client device, wherein content of the user interface output is based on the glare component,
wherein the rendering the user interface output to direct user adjustment of the pose of the client device is performed prior to each of the one or more second images being captured.

* * * * *